United States Patent
Jin et al.

(10) Patent No.: US 12,387,294 B2
(45) Date of Patent: Aug. 12, 2025

(54) IMAGE PROCESSING METHOD AND RELATED DEVICE THEREOF

(71) Applicant: HONOR DEVICE CO., LTD., Shenzhen (CN)

(72) Inventors: Jie Jin, Shenzhen (CN); Zirong Li, Shenzhen (CN); Jilin Liu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 154 days.

(21) Appl. No.: 18/026,679

(22) PCT Filed: Aug. 31, 2022

(86) PCT No.: PCT/CN2022/116201
§ 371 (c)(1),
(2) Date: Mar. 16, 2023

(87) PCT Pub. No.: WO2023/036034
PCT Pub. Date: Mar. 16, 2023

(65) Prior Publication Data
US 2023/0342895 A1    Oct. 26, 2023

(30) Foreign Application Priority Data

Sep. 10, 2021 (CN) .......................... 202111063195.0
Jan. 28, 2022 (CN) .......................... 202210108251.6

(51) Int. Cl.
*G06T 5/50*   (2006.01)
*G06T 5/70*   (2024.01)
(Continued)

(52) U.S. Cl.
CPC .................. *G06T 5/50* (2013.01); *G06T 5/70* (2024.01); *G06T 5/77* (2024.01); *G06V 10/56* (2022.01);
(Continued)

(58) Field of Classification Search
None
See application file for complete search history.

(56) References Cited

U.S. PATENT DOCUMENTS 9,285,309 B2    3/2016  Choi
10,425,599 B2 *  9/2019  Swami ................... H04N 25/58
(Continued)

FOREIGN PATENT DOCUMENTS

CN    107135380 A    9/2017
CN    103971351 B    8/2018
(Continued)

OTHER PUBLICATIONS

Wu, a machine-translated English version of a foreign patent application (CN 112887608 A) (Year: 2021).*
(Continued)

*Primary Examiner* — Kee M Tung
*Assistant Examiner* — Biao Chen
(74) *Attorney, Agent, or Firm* — WOMBLE BOND DICKINSON (US) LLP

(57) ABSTRACT

This application provides an image processing method and a related device thereof, and relates to the image processing field. The image processing method includes: displaying a preview interface, where the preview interface includes a first control; detecting a first operation on the first control; obtaining multiple frames of initial images in response to the first operation, where channel signals included in the multiple frames of initial images are different; processing each frame of initial image in the multiple frames of initial images, to obtain a processed image corresponding to each frame of initial image; and fusing the multiple frames of processed images to obtain a target image. In this application, multiple frames of initial images that include different channel information are obtained, and dynamic image fusion
(Continued)

is completed by using the different channel information, thereby implementing maximum restoration of an image color and optimal performance of a signal-to-noise ratio.

20 Claims, 26 Drawing Sheets

(51) Int. Cl.
    *G06T 5/77*     (2024.01)
    *G06V 10/56*     (2022.01)
    *H04N 23/63*     (2023.01)

(52) U.S. Cl.
    CPC . *H04N 23/632* (2023.01); *G06T 2207/10024* (2013.01); *G06T 2207/20221* (2013.01)

(56) References Cited

U.S. PATENT DOCUMENTS

| | | | |
|---|---|---|---|
| 10,430,931 B2 * | 10/2019 | Rotte | G09G 5/10 |
| 10,831,015 B2 | 11/2020 | Berretta et al. | |
| 11,526,969 B2 | 12/2022 | Fan et al. | |
| 2008/0240601 A1 | 10/2008 | Adams, Jr. et al. | |
| 2013/0094781 A1 | 4/2013 | Koga et al. | |
| 2016/0117800 A1 | 4/2016 | Korkin | |
| 2016/0344956 A1 | 11/2016 | Takado et al. | |
| 2017/0257605 A1 | 9/2017 | Iwakura et al. | |
| 2017/0374281 A1 | 12/2017 | Kim et al. | |
| 2022/0048386 A1 | 2/2022 | Popovic | |
| 2022/0207680 A1 | 6/2022 | Wang et al. | |

FOREIGN PATENT DOCUMENTS

| | | | | |
|---|---|---|---|---|
| CN | 108419061 A | | 8/2018 | |
| CN | 109729281 A | | 5/2019 | |
| CN | 110022469 A | | 7/2019 | |
| CN | 110889403 A | | 3/2020 | |
| CN | 111861902 A | | 10/2020 | |
| CN | 112005153 A | | 11/2020 | |
| CN | 112291479 A | | 1/2021 | |
| CN | 111491111 B | * | 3/2021 | ............ H04N 5/217 |
| CN | 112529775 A | | 3/2021 | |
| CN | 112532855 A | | 3/2021 | |
| CN | 110266954 B | * | 4/2021 | ............ H04N 5/232 |
| CN | 112781522 A | | 5/2021 | |
| CN | 112887608 A | * | 6/2021 | ............ H04N 5/232 |
| CN | 113302912 A | | 8/2021 | |
| JP | 2017207883 A | | 11/2017 | |

OTHER PUBLICATIONS

Yang, a machine-translated English version of a foreign patent (CN 111491111 B) (Year: 2021).*

Kang, a machine-translated English version of a foreign patent (CN 110266954 B) (Year: 2021).*

R. Yasir, et al., "Data-Driven Multispectral Image Registration," 2018 15th Conference on Computer and Robot Vision (CRV), Toronto, ON, Canada, 2018, pp. 230-237.

Zhang Yan, "Research on Pixel-Level Image Fusion Method", Jilin University, Dec. 15, 2019.

* cited by examiner

FIG. 5

IMAGE PROCESSING METHOD AND RELATED DEVICE THEREOF

CROSS-REFERENCE TO RELATED APPLICATIONS

This application is a national stage of International Application No. PCT/CN2022/116201, filed on Aug. 31, 2022, which claims priority to Chinese Patent Application No. 202111063195.0, filed on Sep. 10, 2021, and to Chinese Patent Application No. 202210108251.6, filed on Jan. 28, 2022. The disclosures of each of the aforementioned applications are incorporated herein by references in their entireties.

TECHNICAL FIELD

This application relates to the image processing field, and in particular, to an image processing method and a related device thereof.

BACKGROUND

Currently, most complementary metal oxide semiconductor (complementary metal oxide semiconductor, CMOS) image sensors used for visible light imaging are conventional RGB (red, green, blue) sensors, that is, such an image sensor can receive only a red channel signal, a green channel signal, and a blue channel signal.

The narrow spectral response range restricts the upper limit of image color restoration and has poor signal-to-noise ratio performance under dark light. Therefore, some multi-spectral response visible light imaging CMOS image sensors emerge in the market, to solve the problem of image color restoration and poor signal-to-noise ratio performance under dark light. However, there is no mature processing solution to use the sensor well and achieve the objective of accurate color restoration. Therefore, a new processing solution is urgently needed.

SUMMARY

This application provides an image processing method and a related device thereof, where multiple frames of initial images that include different channel information are obtained, and dynamic image fusion is completed by using the different channel information, thereby implementing maximum restoration of an image color and optimal performance of a signal-to-noise ratio.

To achieve the foregoing objective, the following technical solutions are used in this application:

According to a first aspect, an image processing method is provided and is applied to an electronic device including a multi-spectral sensor, where the method includes: displaying a preview interface, where the preview interface includes a first control;

detecting a first operation on the first control;
obtaining multiple frames of initial images in response to the first operation, where channel signals included in the multiple frames of initial images are different;
processing each frame of initial image in the multiple frames of initial images, to obtain a processed image corresponding to each frame of initial image; and
fusing the multiple frames of processed images to obtain a target image.

In this embodiment of this application, the multi-spectral sensor refers to another multi-spectral sensor whose spectral response range is wider than that of the RGB sensor.

According to the image processing method provided in this embodiment of this application, the multiple frames of initial images that include different channel information are obtained, and then the initial images of different channels are processed and fused, so that maximum restoration of image colors and optimal performance of a signal-to-noise ratio can be implemented, thereby avoiding a color deviation problem.

In a possible implementation of the first aspect, the processing each frame of initial image in the multiple frames of initial images includes:
performing front-end processing on each frame of initial image in the multiple frames of initial images to obtain a front-end processed image located in a RAW domain; and
the fusing the multiple frames of processed images to obtain a target image includes:
performing RAW domain fusion processing on the front-end processed images to obtain a fused image located in the RAW domain; and
performing first back-end processing on the fused image located in the RAW domain to obtain the target image located in a YUV domain.

In this implementation, based on the multiple frames of initial images that include different channel signals, front-end processing is performed before RAW domain fusion, and then first back-end processing is performed on the fused image, so that the fused image is converted from the RAW domain to the YUV domain to obtain the target image. Prior to fusion in the RAW domain, the initial images are each processed in a series of processes, and more details are reserved for fusion in the RAW domain, so that maximum restoration of an image color and optimal performance of an SNR can be achieved.

In a possible implementation of the first aspect, the processing each frame of initial image in the multiple frames of initial images includes:
performing front-end processing and color correction on each frame of initial image in the multiple frames of initial images to obtain a corrected image located in an RGB domain, where the color correction is used for converting an image from an RAW domain into the RGB domain; and
the fusing the multiple frames of processed images to obtain a target image includes:
performing RGB domain fusion processing on the corrected images to obtain a fused image located in the RGB domain; and
performing second back-end processing on the fused image located in the RGB domain to obtain the target image located in a YUV domain.

In this implementation, based on the multiple frames of initial images that include different channel signals, the RGB domain fusion is performed after front-end processing and color correction, and then second back-end processing is performed on the fused image, so that the fused image is converted from the RGB domain to the YUV domain, to obtain the target image. Because a series of processing and color correction are performed on the initial images before the RGB domain fusion, maximum restoration of an image and optimal performance of a signal-to-noise ratio can be implemented.

In a possible implementation of the first aspect, the processing each frame of initial image in the multiple frames of initial images includes:

performing front-end processing and first back-end processing on each frame of initial image in the multiple frames of initial images to obtain an intermediate processed image located in a YUV domain, where the intermediate processing is used for converting an image from an RGB domain into the YUV domain; and the fusing the multiple frames of processed images to obtain a target image includes:

performing YUV domain fusion processing on the intermediate processed images to obtain a fusion image located in the YUV domain, where the fusion image is the target image.

In this embodiment, the first back-end processing may also be referred to as first intermediate processing or second intermediate processing.

In this implementation, based on the multiple frames of initial images that include different channel signals, front-end processing and first back-end processing are performed before YUV domain fusion is performed to obtain the target image. Because a series of processing and color correction are performed on the initial images before YUV domain fusion, maximum restoration of an image color and optimal performance of a signal-to-noise ratio can be implemented.

In a possible implementation of the first aspect, the method further includes:

in a same image signal processor, processing each frame of initial image in the multiple frames of initial images to obtain a processed image corresponding to each frame of initial image, and fusing the multiple frames of processed images to obtain the target image.

In this implementation, processing in one image signal processor can reduce costs.

In a possible implementation of the first aspect, the method further includes:

processing different initial images in the multiple frames of initial images in different image signal processors respectively, to obtain respective corresponding processed images.

In this implementation, to obtain a better color restoration effect for subsequent fusion processing in the image processing procedure, the first front-end processing and the second front-end processing need to be performed in the two image signal processors respectively.

In a possible implementation of the first aspect, the method further includes:

obtaining a to-be-preprocessed image by using a multi-spectral sensor; and preprocessing the to-be-preprocessed image to obtain the multiple frames of initial images, where the preprocessing is used for converting a channel signal included in the to-be-preprocessed image.

It should be understood that the to-be-preprocessed image includes multiple channel signals.

Optionally, the preprocessing may be horizontal direction binning, vertical direction binning, v2h2 binning, or remosaic.

In this implementation, the multi-spectral sensor may be configured to: obtain only one frame of the to-be-preprocessed image that includes a relatively large quantity of channel signals, and perform pre-processing on the to-be-pre-processed image, that is, split the to-be-pre-processed image, so as to obtain the multiple frames of initial images that include different channel signals; and then obtain the target image by means of processing and fusion based on the multiple frames of initial images that include different channel signals.

In a possible implementation of the first aspect, multiple image signals are obtained by using a multi-spectral sensor; and the multiple frames of initial images are determined in the multi-spectral sensor based on the multiple image signals, and front-end processing is performed on each frame of initial image in the multiple frames of initial images to obtain the front-end processed image located in the RAW domain; and RAW domain fusion processing is performed on the front-end processed image in the multi-spectral sensor to obtain the fused image located in the RAW domain.

The multiple image signals may be obtained by using an effective pixel area in the multi-spectral sensor.

In this implementation, generally, the sensor includes one or more rows of pixels that do not participate in light sensing. To avoid affecting a subsequent color restoration effect, these pixels are excluded to obtain an image signal by using only valid pixels in the effective pixel area in which light can be sensed in the multi-spectral sensor, so as to improve a color restoration effect.

In a possible implementation of the first aspect, the method further includes:

when the multiple frames of initial images include a first initial image and a second initial image with different channel signals, fusion is performed by using the following formula:

$$I\_f(i,j)=W\_ij \times I\_c(i,j)+(1-W\_ij) \times I\_r(i,j)$$

(i, j) is pixel coordinates, $I\_c$ (i, j) is a processed image corresponding to the first initial image, $I\_r$ (i, j) is a processed image corresponding to the second initial image, $W\_ij$ is a weight allocated to the processed image corresponding to the first initial image, $1-W\_ij$ is a weight allocated to the processed image corresponding to the second initial image, and $I\_f(i,j)$ is a fused image.

In this implementation, different weights are allocated to different processed images, and a better fusion effect can be achieved.

In a possible implementation of the first aspect, the method further includes:

determining $W\_ij$ by using a formula: $W\_ij=Wa\_ij \times para1+Wb\_ij \times para2+Wc\_ij \times para3$; where $Wa\_ij$ is a light intensity weight, $Wa\_ij=E/E\_standard$, E is illuminance in a photographing environment, and $E\_standard$ is preset standard illuminance; $Wb\_ij$ is a color temperature weight, $Wb\_ij=T/T\_standard$, T is a color temperature in a photographing environment, and $T\_standard$ is a preset standard color temperature; $Wc\_ij$ is a scenario type weight, and scenario type weights corresponding to different scenario types are different; the scenario types include at least one of Portrait or Landscape; and para1, para2, and para3 are preset parameters.

In this implementation, a fusion effect can be improved in multiple directions and comprehensively by performing a fine classification on fusion weights.

In a possible implementation of the first aspect, the method further includes:

when the scenario type is HDR, $Wc\_ij=(GA\_standard-GA\_ij)/GA\_standard$; where $GA\_ij$ is a grayscale value corresponding to a pixel whose pixel coordinates are (i, j), and $GA\_standard$ is a preset standard grayscale value.

In this implementation, because image content of the HDR scene type is relatively different, a different scene type weight may be set for each pixel or sub-region, so as to implement fine adjustment.

In a possible implementation of the first aspect, the front-end processing includes at least one of defect pixel correction, noise reduction, lens shading correction, and wide range compression.

In a possible implementation of the first aspect, the first back-end processing includes color correction and conversion from RGB domain to YUV domain.

In a possible implementation of the first aspect, the second back-end processing includes conversion from RGB domain to YUV domain.

In a possible implementation of the first aspect, both the first back-end processing and the second back-end processing further include at least one of Gamma correction or style change.

According to a second aspect, an electronic device is provided, including a module/unit configured to execute any one of the first aspect or the implementations in the first aspect.

According to a third aspect, an electronic device is provided, including a multi-spectral sensor, a processor, and a memory; where the multi-spectral sensor is configured to obtain multiple frames of initial images, where channel signals included in the multiple frames of initial images are different;
the memory is configured to store a computer program that can run on the processor; and
the processor is configured to perform a processing step in any one of the first aspect or the implementations of the first aspect.

In a possible implementation of the third aspect, the processor includes one image signal processor, and the image signal processor is configured to: process each frame of initial image in the multiple frames of initial images, to obtain a processed image corresponding to each frame of initial image; and fuse the multiple frames of processed images to obtain a target image.

In a possible implementation of the third aspect, the processor includes multiple image signal processors, and different image signal processors of the multiple image signal processors are configured to process different initial images in the multiple frames of initial images to obtain respective corresponding processed images.

In a possible implementation of the third aspect, the multi-spectral sensor is further configured to obtain a to-be-preprocessed image; and
configured to preprocess the to-be-preprocessed image to obtain the multiple frames of initial images, where the preprocessing is used for converting a channel signal included in the to-be-preprocessed image.

In a possible implementation of the third aspect, the multi-spectral sensor is further configured to obtain multiple image signals; and
determine the multiple frames of initial images according to the multiple image signals, and perform front-end processing on each frame of initial image in the multiple frames of initial images to obtain a front-end processed image located in a RAW domain; and
the multi-spectral sensor is further configured to perform RAW domain fusion processing on the front-end processed images to obtain a fused image located in the RAW domain.

According to a fourth aspect, a chip is provided, including: a processor, configured to invoke and run a computer program from a memory, so that a device installed with the chip performs the processing step in any one of the first aspect or the implementations of the first aspect.

According to a fifth aspect, a computer-readable storage medium is provided, where the computer-readable storage medium stores a computer program, the computer program includes a program instruction, and when being executed by a processor, the program instruction enables the processor to perform the processing step in any one of the first aspect or the implementations of the first aspect.

According to a sixth aspect, a computer program product is provided, where the computer program product includes computer program code, and when the computer program code is run by an electronic device, the electronic device is enabled to perform the processing step in any one of the first aspect or the implementations of the first aspect.

In the embodiments of this application, the multiple frames of initial images that include different channel information are obtained, and then the initial images of different channels are processed and fused, so that maximum restoration of an image color and optimal performance of a signal-to-noise ratio can be implemented, thereby avoiding a color deviation problem.

BRIEF DESCRIPTION OF DRAWINGS

FIG. 5 is a schematic diagram of two frames of obtained initial images according to an embodiment of this application.

DESCRIPTION OF EMBODIMENTS

The following describes the technical solutions in this application with reference to the accompanying drawings.

In the description of the embodiments of this application, unless otherwise stated, "I" represents or, for example, A/B may represent A or B. In this specification, "and/or" is merely an association relationship for describing associated objects, and indicates that three relationships may exist. For example, A and/or B may indicate that only A exists, both A and B exist, and only B exists. In addition, in the description of the embodiments of this application, "multiple" refers to two or more than two.

In the following, terms "first" and "second" are merely used for description purposes, and shall not be understood as an indication or implication of relative importance or implicitly indicate the number of indicated technical features. Therefore, a feature defined as "first" or "second" may explicitly or implicitly include one or more of the features. In the description of the embodiments, unless otherwise stated, "a plurality of" means two or more.

First, some terms in the embodiments of this application are described for ease of understanding by a person skilled in the art.

1. RGB (red, green, blue) color space or RGB domain refers to a color model related to a structure of a human visual system. Based on a structure of human eyes, all colors are treated as different combinations of red, green, and blue.

2. YUV color space or YUV domain refers to a color coding method. Y indicates brightness, and U and V indicate chromaticity. The foregoing RGB color space focuses on human eye sensitivity to colors, while the YUV color space focuses on visual sensitivity to brightness, and the RGB color space and the YUV color space may be converted into each other.

3. A pixel value refers to a group of color components corresponding to each pixel in a color image in an RGB color space. For example, each pixel corresponds to a set of three fundamental color components, where the three fundamental color components are respectively a red component R, a green component G, and a blue component B.

Figure 1:
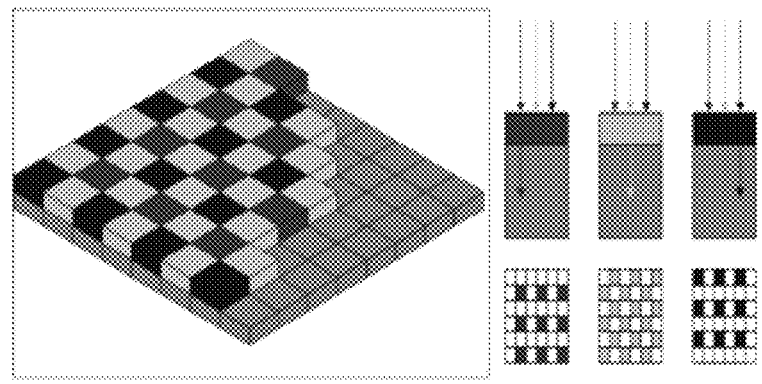
FIG. 1 is a schematic diagram of imaging of a conventional RGB COMS Sensor.

4. Bayer pattern (bayer pattern) color filter array (color filter array, CFA): In a process of converting an image from an actual scene to image data, an image sensor receives information of three channel signals: a red channel signal, a green channel signal, and a blue channel signal, and then combines the information of the three channel signals into a color image. However, in this solution, three filters are correspondingly required at each pixel location, which is expensive and is difficult to prepare. Therefore, as shown in FIG. 1, a layer of color filter array may be covered on a surface of an image sensor, so as to obtain information of the three channel signals. The bayer pattern color filter array refers to arrange filters in a chessboard format. For example, a minimum repetition unit in the bayer pattern color filter array is: A filter for obtaining a red channel signal, two filters for obtaining a green channel signal, and a filter for obtaining a blue channel signal are arranged in a 2×2 manner.

5. A bayer image (bayer image) is an image output by an image sensor based on a bayer pattern color filter array. Pixels of a plurality of colors in the image are arranged in a bayer pattern. Each pixel in the bayer pattern image corresponds to a channel signal of only one color. For example, because a person's vision is relatively sensitive to green, it may be set that green pixels (pixels corresponding to green channel signals) occupy 50% of all pixels, and blue pixels (pixels corresponding to blue channel signals) and red pixels (pixels corresponding to red channel signals) each occupy 25% of all the pixels. A minimum repetition unit of the bayer pattern image is: One red pixel, two green pixels, and one blue pixel are arranged in a 2×2 manner. It should be understood that a RAW domain is a RAW color space, and an image of a bayer pattern may be referred to as an image located in the RAW domain.

6. A gray image (gray image) is a single-channel image, and is used to indicate different brightness degrees, the brightest is all white, and the darkest is all black. That is, each pixel in the gray image corresponds to a different degree of brightness between black and white. Generally, to describe a brightness change from the brightest to the darkest, the brightness is divided into, for example, 256 parts, which represent 256 levels of brightness, and are also referred to as 256 gray orders (gray orders 0~255).

7. A spectral response (spectral response) may also be referred to as spectral sensitivity, and the spectral response represents a capability of an image sensor for converting incident light energy of different wavelengths into electric energy. If an amount of light incident on the image sensor at a wavelength is converted into the number of photons, and a current generated by the image sensor and transmitted to an external circuit is represented by the number of electrons, it represents a capability that each incident photon can be converted into an electron transmitted to the external circuit, the capability is referred to as quantum efficiency (quantum efficiency, QE), and the unit is represented by a percentage. The spectral response of the image sensor depends on parameters such as the quantum efficiency, a wavelength, and an integration time.

8. Half-peak width refers to the width of the peak at half the height of the spectrum peak, and is also referred to as half width.

The foregoing is a brief description of the terms involved in the embodiments of this application, and details are not described in the following.

Currently, most CMOS image sensors used for visible light imaging are conventional RGB sensors. Because of a limitation of hardware, this type of image sensor can receive only a red channel signal, a green channel signal, and a blue channel signal. Consequently, compared with a human eye, a spectral response range of the image sensor is very narrow, and a relatively narrow spectral response range limits a color restoration capability of the image sensor, and affects information such as a color of a restored image.

In addition, compared with an effect on a signal-to-noise ratio in a strong light environment, a narrow spectral response range has a more significant effect on a signal-to-noise ratio in a dark light environment, and consequently, signal-to-noise ratio performance of a restored image in the dark light environment is very poor.

The narrow spectral response range of the RGB sensor restricts the upper limit of image color restoration and has poor signal-to-noise ratio performance under dark light. Therefore, some multi-spectral response visible light imaging CMOS sensors emerge in the market, to solve the problem of image color restoration and poor signal-to-noise ratio performance under dark light. However, there is no mature processing solution to use the sensor well and achieve the objective of accurate color restoration.

It should be understood that the multi-spectrum refers to that a spectral band used for imaging includes two or more than two bands. According to this definition, because the RGB sensor uses three bands of red, green, and blue, the RGB sensor is also strictly a multi-spectral response sensor. The multi-spectral response visible light CMOS sensor in this application refers to another multi-spectral sensor whose spectrum response range is wider than that of the RGB sensor.

For example, the multi-spectral sensor may be an RYYB sensor, an RGBW sensor, or the like. It should be understood that the RYYB sensor receives a red channel signal, a yellow channel signal, and a blue channel signal. The RGBW sensor receives a red channel signal, a green channel signal, a blue channel signal, and a white channel signal.

Figure 2:
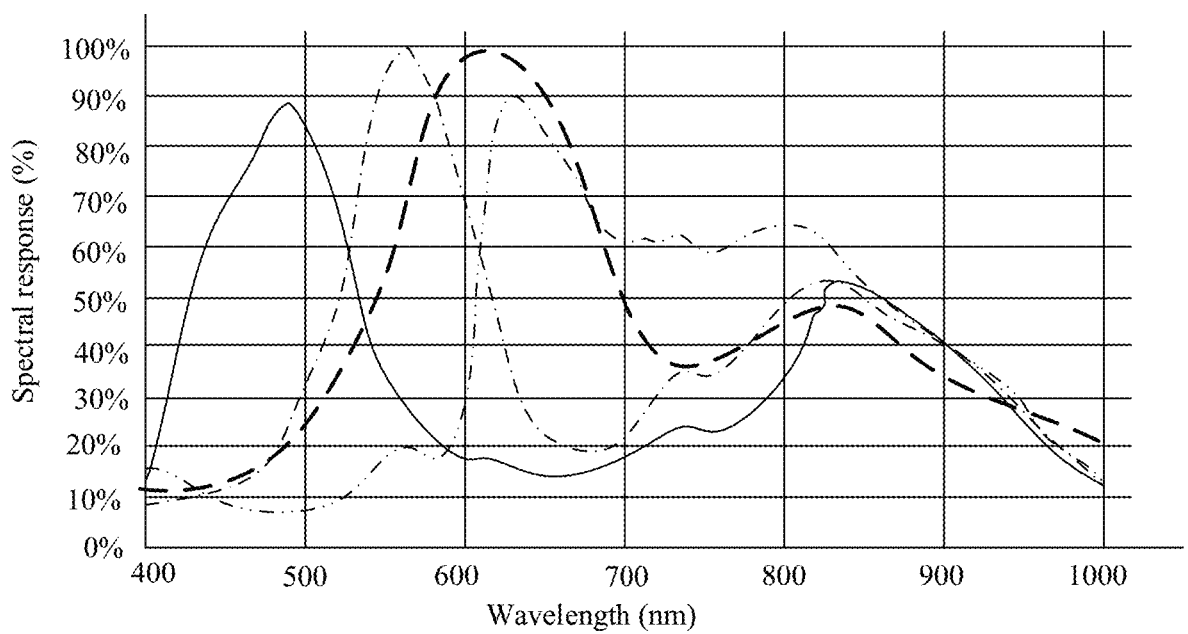
FIG. 2 shows RGBY spectral response curves.

FIG. 2 shows a schematic diagram of RGBY spectral response curves. The horizontal axis represents a wavelength, and the vertical axis represents spectral responsivity corresponding to different spectra. A spectral response curve indicated by Y represents different spectral responses corresponding to yellow light at different wavelengths, a spectral response curve indicated by R represents different spectral responses corresponding to red light at different wavelengths, a spectral response curve indicated by G represents different spectral responses corresponding to green light at different wavelengths, and a spectral response curve indicated by B represents different spectral responses corresponding to blue light at different wavelengths.

The RYYB sensor is used as an example. Compared with the RGB sensor, a yellow channel signal received by the RYYB sensor is equivalent to a superposition of a red channel signal and a green channel signal. In this way, by increasing a light transmission amount of yellow light, performance under dark light can be improved, and a signal-to-noise ratio is improved. However, as shown in FIG. 2, in the spectral response curve diagram, a half-peak width corresponding to the spectral response curve indicated by Y is wider relative to half-peak widths corresponding to the spectral response curves respectively indicated by R and G, which leads to a problem of losing some color information when the image is restored, and further leads to a color cast in a specific scene or overexposure.

The RGBW sensor is used as an example. Compared with the RGB sensor, a white channel signal received by the RGBW sensor is equivalent to superposition of all color channel signals. Light transmission is better, and a signal-to-noise ratio in dark light can be improved. Similarly, because a half-peak width corresponding to white light in a spectral response graph (not shown in FIG. 2) is very wide, a problem of losing some color information also occurs during image restoration, and consequently a color cast in a specific scene or overexposure is caused.

Therefore, a new processing solution is urgently needed to effectively solve the foregoing problems.

In view of this, embodiments of this application provide an image processing method. Multiple frames of initial images that include different channel information are obtained, and dynamic image fusion is completed by using the different channel information, thereby implementing maximum restoration of an image color and optimal performance of a signal-to-noise ratio.

The image processing method provided in embodiments of this application may be applied to the photographing field. For example, the method may be applied to photographing an image or recording a video in a dark light environment.

Figure 3:
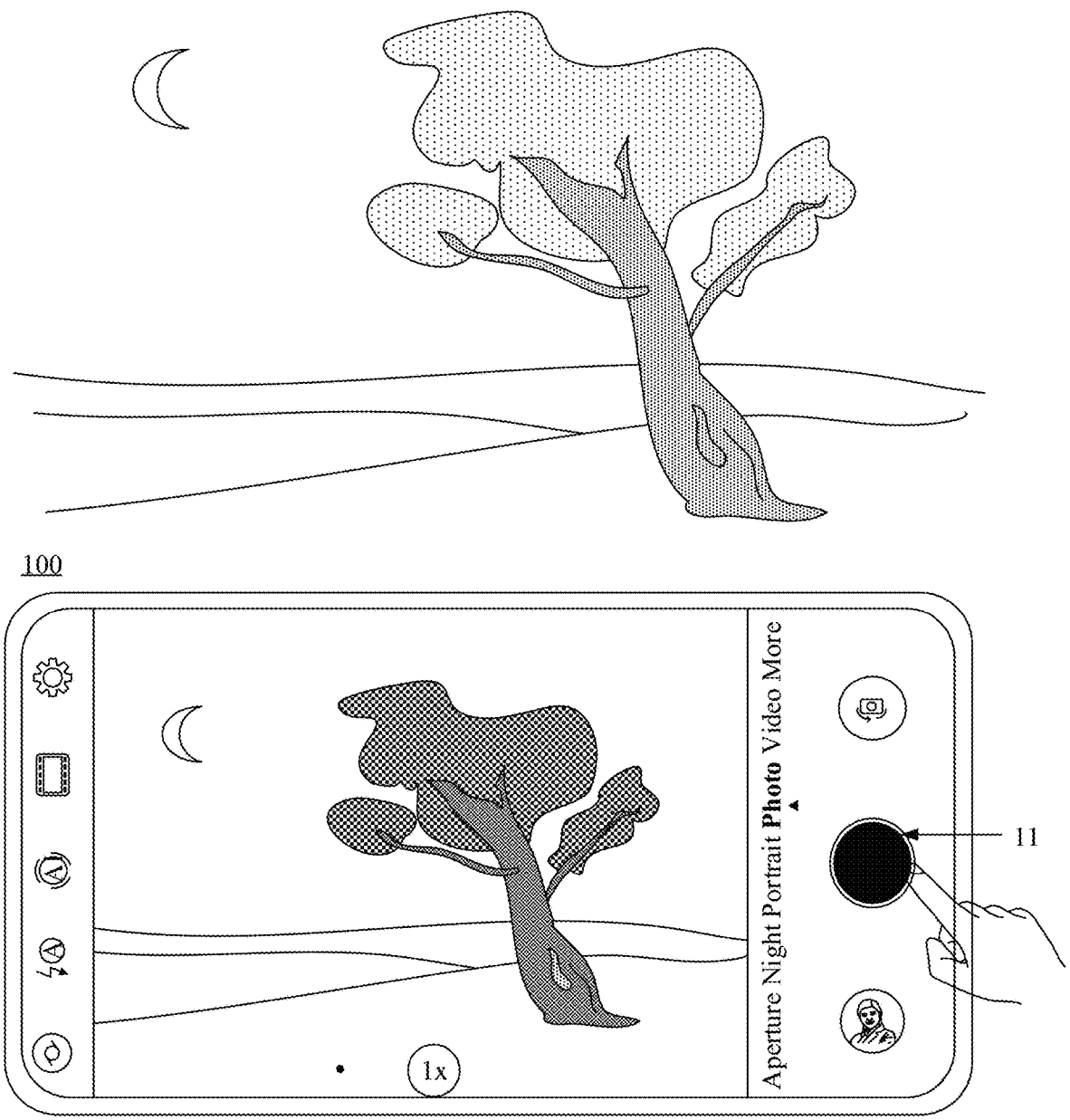
FIG. 3 is a schematic diagram of an application scenario.

FIG. 3 is a schematic diagram of an application scenario according to an embodiment of this application. An example in which an electronic device is a mobile phone is used for description. The mobile phone includes a multi-spectral sensor that is not an RGB sensor.

As shown in FIG. 3, in response to an operation of a user, the electronic device may start a camera application, and display a graphical user interface (graphical user interface, GUI) shown in FIG. 3. The GUI interface may be referred to as a preview interface. The preview interface includes multiple photographing mode options and a first control. The multiple photographing modes include, for example, a photographing mode, a video recording mode, and the like. The first control is, for example, a photographing button 11, where the photographing button 11 is used to indicate that the current photographing mode is one of multiple photographing modes.

For example, as shown in FIG. 3, when the user enables the camera application, and wants to perform photographing on the outdoor grassland and the tree at night, the user taps the photographing button 11 on the preview interface. After detecting that the user taps the photographing button 11, the electronic device runs, in response to the tap operation, a program corresponding to the image processing method to obtain an image.

It should be understood that, although the multi-spectral sensor included in the electronic device is not an RGB sensor, for example, an RYYB sensor, a spectral response range of the electronic device is enlarged compared with the prior art, that is, a color restoration capability and signal-to-noise ratio performance are improved. However, because of an impact of yellow light, a color of an image photographed by the electronic device is offset from a color in an actual scenario, and therefore, a color of the photographed image is distorted. For this reason, if the electronic device processes the image by using the image processing method provided in embodiments of this application, the color can be corrected, a visual effect of the photographed image can be improved, and image quality can be improved.

It should be understood that the foregoing is an example for describing an application scenario, and no limitation is imposed on the application scenario of this application.

The following describes in detail the image processing method provided in the embodiments of this application with reference to the accompanying drawings in the specification.

Embodiment 1

Figure 4:
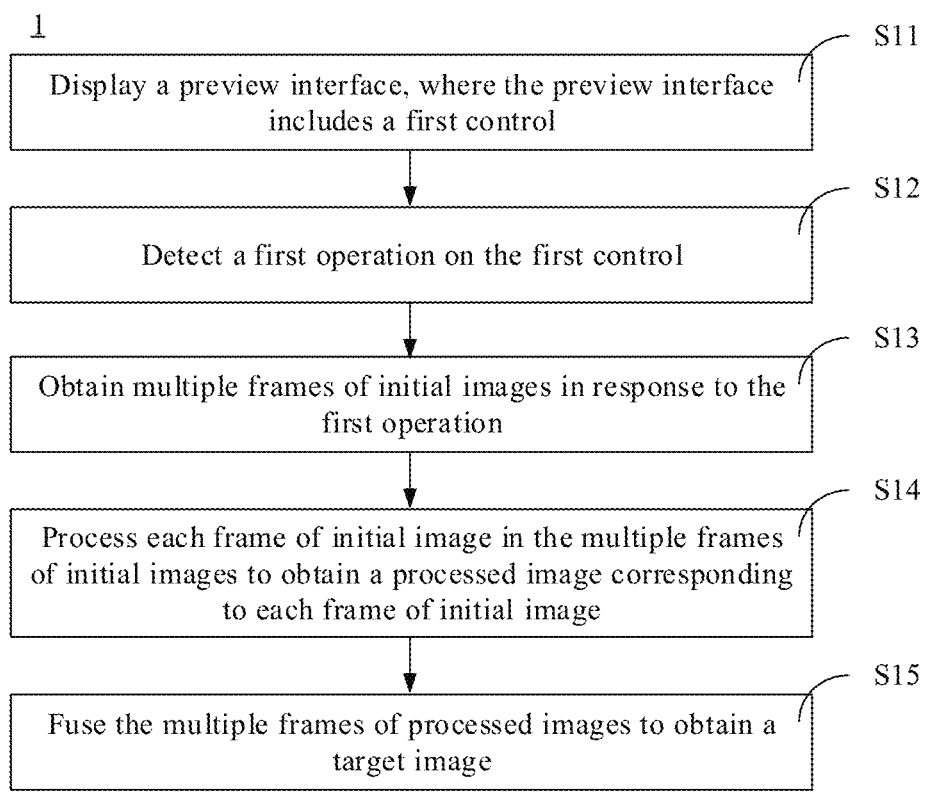
FIG. 4 is a schematic flowchart of an image processing method according to an embodiment of this application.

FIG. 4 is a schematic flowchart of an image processing method according to an embodiment of this application. As shown in FIG. 4, an embodiment of this application provides an image processing method 1. The image processing method 1 includes the following S11 to S15.

S11: Display a preview interface, where the preview interface includes a first control.

S12: Detect a first operation on the first control.

The first control is, for example, the photographing button 11 shown in FIG. 3, and the first operation is, for example, a tap operation. Certainly, the first operation may also be another operation. This is not limited in this embodiment of this application.

S13: Obtain multiple frames of initial images in response to the first operation. The multiple frames of initial images include different channel signals.

It should be understood that all the multiple frames of initial images are bayer-pattern images, or are located in a RAW domain. That the multiple frames of initial images include different channel signals means that a plurality of colors corresponding to pixels that are arranged in a bayer pattern and that are the multiple frames of initial images are different.

It should be understood that the multiple frames of initial images may be collected by using the multi-spectral sensor included in the electronic device itself or obtained from another device, and may be specifically set as required. This is not limited in this embodiment of this application.

It should be understood that when the multi-spectral sensor of the electronic device is used to obtain the multiple frames of initial images, the multi-spectral sensor may simultaneously output the multiple frames of initial images that include different channel information, or may serially output the multiple frames of initial images that include different channel information. Specifically, selection and setting may be performed as required. This is not limited in this embodiment of this application.

It should be further understood that, although the multiple frames of initial images may be output at the same time or output in serial from the multi-spectral sensor, in any case, the multiple frames of initial images are actually generated by photographing the to-be-photographed scene at a same time.

Figure 5:
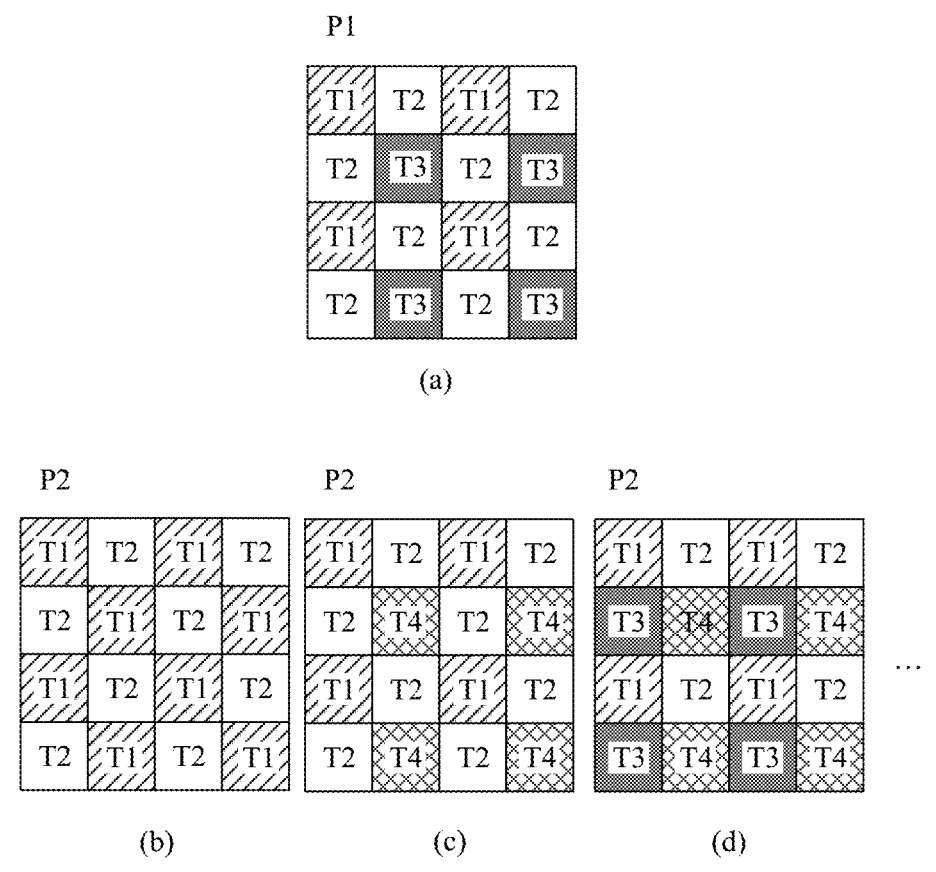

FIG. 5 shows a schematic diagram of two frames of obtained initial images.

Exemplarily, two frames of initial images are obtained. As shown in (a) in FIG. 5, one initial image P1 includes channel signals of three colors, for example, a channel signal T1, a channel signal T2, and a channel signal T3. As shown in (b) in FIG. 5, another initial image P2 includes channel signals of two colors (for example, T1 and T2); or as shown in (c) in FIG. 5, the initial image P2 may include channel signals of three colors (for example, T1, T2 and T4); or as shown in (d) in FIG. 5, the initial image P2 may include channel signals of four colors (for example, T1, T2, T3 and T4). Certainly, the initial image P2 may alternatively include channel signals of more colors. This is not limited in this embodiment of this application.

For example, in the two initial images obtained in FIG. 5, the channel signals of three colors included in the initial image P1 are respectively a red channel signal (R), a green channel signal (G), and a blue channel signal (B), and the three colors are repeated in an RGGB arrangement manner.

For example, when the initial image P2 includes channel signals of three colors, the channel signals of three colors included in the initial image P2 may be a red channel signal (R), a yellow channel signal (Y), and a blue channel signal (B), and the three colors may be repeated in an RYYB arrangement manner. Alternatively, the channel signals of three colors included in the initial image P2 may be a red channel signal (R), a green channel signal (G), and a cyan channel signal (C), and the three colors may be repeated in an RGGC arrangement manner. Alternatively, the channel signals of three colors included in the initial image P2 may be a red channel signal (R), a yellow channel signal (Y), and a cyan channel signal (C), and the three colors are repeated in an RYYC arrangement manner. Alternatively, the channel signals of three colors included in the initial image P2 may be a red channel signal (R), a white channel signal (W), and a blue channel signal (B), and the three colors are repeated in an RWWB arrangement manner. Alternatively, the channel signals of three colors included in the initial image P2 may be a cyan channel signal (C), a yellow channel signal (Y), and a magenta channel signal (M), and the three colors may be repeated in a CYYM arrangement manner.

When the initial image P2 includes channel signals of four colors, the channel signals of the four colors included in the initial image P2 may be a red channel signal (R), a green channel signal (G), a blue channel signal (B), and a white channel signal (W), and the four colors may be repeated in an RGBW arrangement manner. Alternatively, the channel signals of four colors included in the initial image P2 may be a red channel signal (R), a green channel signal (G), a blue channel signal (B), and a near infrared channel signal (NIR), and the four colors may be repeated in an RGB-NIR arrangement manner.

It should be understood that the foregoing is an example for describing a channel signal, and no limitation is imposed on the channel signal in this application.

Figure 6:
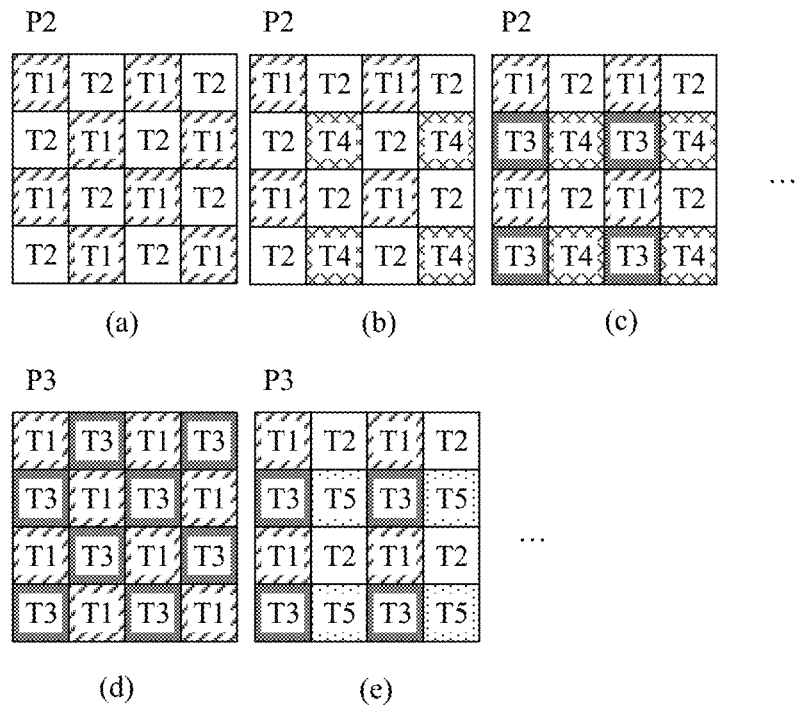
FIG. 6 is a schematic diagram of another two frames of obtained initial images according to an embodiment of this application.

FIG. 6 shows another schematic diagram of two frames of obtained initial images.

Exemplarily, two initial images are obtained. As shown in (a) in FIG. 6, (b) in FIG. 6, and (c) in FIG. 6, a frame of initial image P2 is the same as the case of P2 shown in (b) in FIG. 5, (c) in FIG. 5, and (d) in FIG. 5. Details are not described herein again. As shown in (d) in FIG. 6, another initial image P3 may include channel signals of two colors (for example, T1 and T3), or may include channel signals of four colors (for example, T1, T2, T3 and T5), or certainly may include channel signals of more colors. This is not limited in this embodiment of this application.

Figure 7:
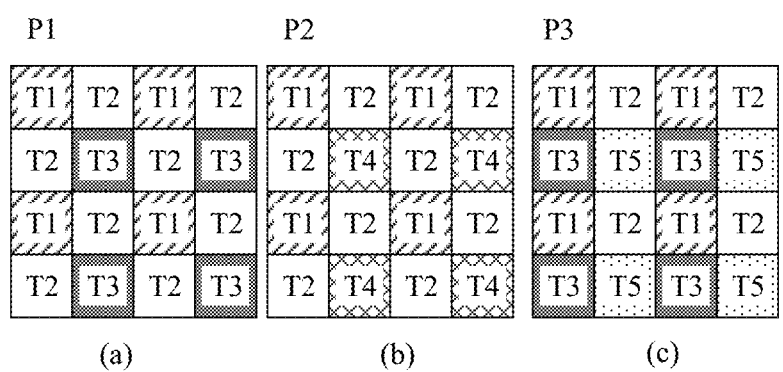
FIG. 7 is a schematic diagram of three frames of obtained initial images according to an embodiment of this application.

FIG. 7 shows a schematic diagram of three frames of obtained initial images.

Exemplarily, three initial images are obtained. As shown in (a) in FIG. 7, the initial image P1 includes channel signals of three colors (for example, T1, T2, and T3). As shown in (b) in FIG. 7, the initial image P2 also includes channel signals of three colors (for example, T1, T2, and T4). As shown in (c) in FIG. 7, the initial image P3 includes channel signals of four colors (for example, T1, T2, T3, and T5). Certainly, more frames of initial images may be obtained, and each frame of initial image includes a channel signal of a different color. This is not limited in this embodiment of this application.

It should be understood that the foregoing is an example for describing the obtained two initial images and the obtained three initial images, and no limitation is imposed on a quantity of frames of the obtained initial images in this application.

It should be further understood that when channel signals included in the multiple frames of initial images respectively are different, a color restoration capability in a subsequent processing process is better. When channel signals included in the multiple frames of initial images respectively have a same part, a signal-to-noise ratio improvement effect is better in a subsequent processing process.

S14: Process each frame of initial image in the multiple frames of initial images to obtain a processed image corresponding to each frame of initial image.

S15: Fuse the multiple frames of processed images to obtain a target image.

According to the image processing method provided in this embodiment of this application, the multiple frames of initial images that include different channel information are obtained, and then the initial images of different channels are processed and fused, so that maximum restoration of an image color and optimal performance of a signal-to-noise ratio can be implemented, thereby avoiding a color deviation problem.

Embodiment 2a

Figure 8:
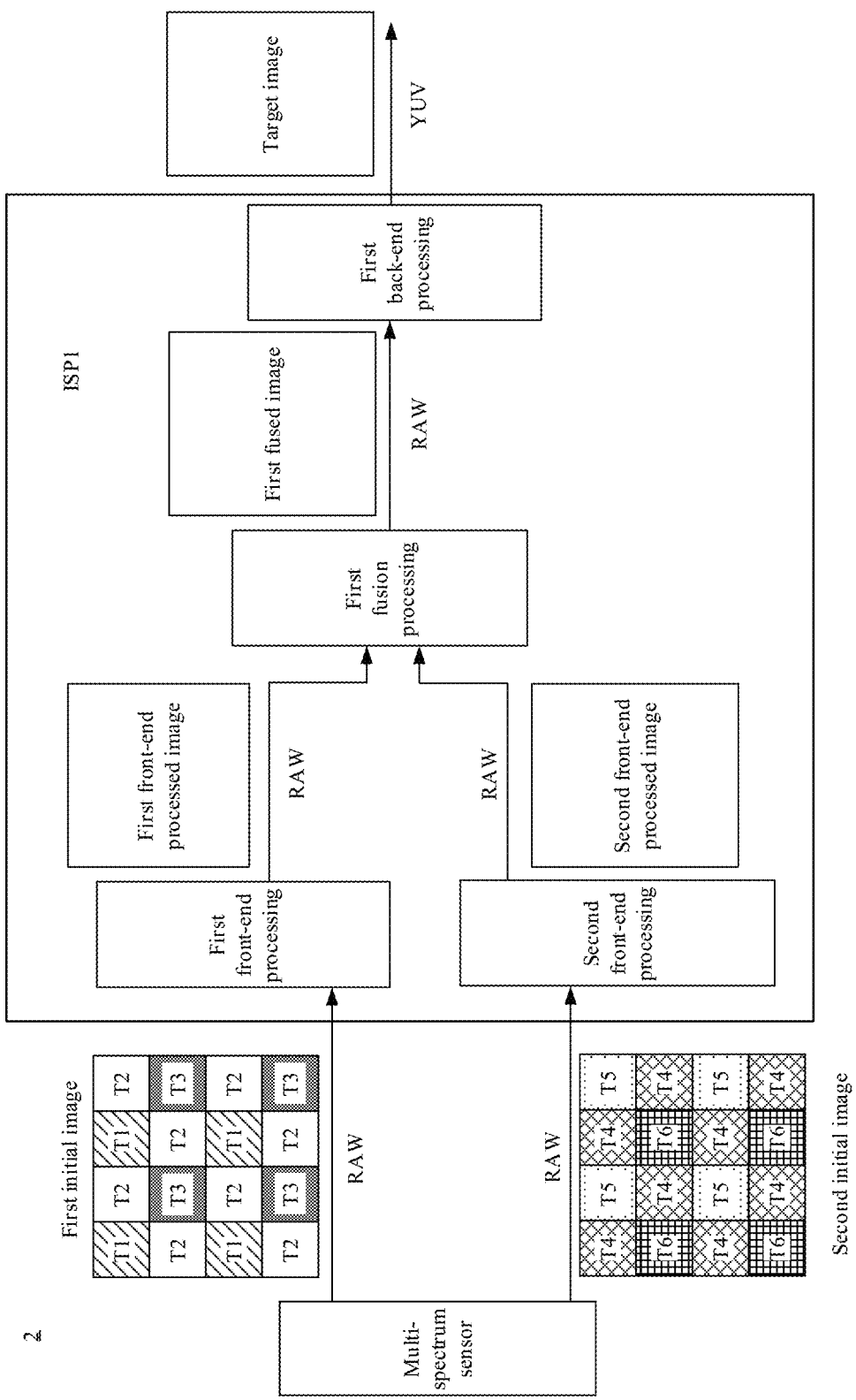
FIG. 8 is a schematic flowchart of an image processing method according to an embodiment of this application.

FIG. 8 is a schematic flowchart of an image processing method according to an embodiment of this application. As shown in FIG. 8, an embodiment of this application provides an image processing method 2. The image processing method 2 includes the following S21 to S26.

S21: Display a preview interface, where the preview interface includes a first control.

S22: Detect a first operation on the first control.

Descriptions of the first control and the first operation are the same as those in the foregoing S11 and S12, and are not described herein again.

S23: In response to the first operation, obtain a first initial image and a second initial image by using a multi-spectral sensor, where channel signals included in the first initial image and the second initial image are different.

For example, the first initial image includes three channel signals, and each pixel corresponds to one color channel signal. The channel signals are a red channel signal, a green channel signal, and a blue channel signal, for example, T1, T2, and T3 shown in FIG. 8. The second initial image also includes three channel signals, and each pixel is corresponding to one color channel signal. The three channel signals are different from the channel signals of the first initial image, and are respectively a cyan channel signal, a magenta channel signal, and a yellow channel signal, for example, T4, T5, and T6 shown in FIG. 8. The examples are still used for the first initial image and the second initial image in the following, and details are not described again.

Herein, both the first initial image and the second initial image are bayer-pattern images, or both are images located in a RAW domain. Because channel signals included in the first initial image and the second initial image are different, a color restoration capability in a subsequent processing process is better.

It should be understood that a quantity of channel signals that can be obtained by the multi-spectral sensor should be greater than or equal to a sum of a quantity of channel signals corresponding to the first initial image and a quantity of channel signals corresponding to the second initial image. For example, when the first initial image includes a red channel signal, a green channel signal, and a blue channel signal, and the second initial image includes a cyan channel signal, a magenta channel signal, and a yellow channel signal, the multi-spectral sensor may obtain at least six channel signals of different colors, which are respectively a red channel signal, a green channel signal, a blue channel signal, a cyan channel signal, a magenta channel signal, and a yellow channel signal. Therefore, the first initial image and the second initial image that each include three different color channel signals can be generated.

It should be understood that, in this embodiment of this application, a quantity of initial images obtained by using the multi-spectral sensor and a channel signal corresponding to each frame of initial image may be set and changed as required. This is not limited in this embodiment of this application, and the foregoing is merely an example.

It should be understood that herein, the multi-spectral sensor may output the first initial image and the second initial image through one data path, or may output the first initial image and the second initial image through two data paths respectively, which may be specifically set as required. This is not limited in this embodiment of this application. FIG. 8 is a schematic diagram of transmission by using two data paths.

S24: In a first image signal processor (ISP1 shown in FIG. 8), perform first front-end processing on the first initial image to obtain a first front-end processed image located in a RAW domain; and in the first image signal processor, perform second front-end processing on the second initial image to obtain a second front-end processed image located in the RAW domain.

It should be understood that both the processed first front-end processed image and the processed second front-end processed image are in the RAW domain, that is, both the first front-end processed image and the second front-end processed image are bayer-pattern images.

Optionally, both the first front-end processing and the second front-end processing may include at least one of defect pixel correction (defect pixel correction, DPC), noise reduction, lens shading correction (lens shading correction, LSC), and wide range compression (wide range compression, WDR).

It should be understood that defect pixel correction is used to resolve a defect in an array formed by points of light collected by the multi-spectral sensor or an error in a process of converting an optical signal. A defect pixel is usually eliminated by averaging other surrounding pixels in the luminance domain.

It should be understood that noise reduction is used to reduce noise in an image, and a general method includes mean filtering, Gaussian filtering, bilateral filtering, and the like. The lens shading correction is used to eliminate a problem that a color and brightness around an image are inconsistent with those in an image center due to a lens optical system.

The wide range compression refers to: When a high-brightness area that is irradiated by a strong light source (sunlight, a lamp, or a backlight) and a shadow area, a backlight area, or the like that has low brightness simultaneously exist in an image, a bright area of the image becomes white due to overexposure, and a dark area becomes black due to underexposure, which seriously affects image quality. Therefore, the brightest area and the dark area may be adjusted in a same scenario, for example, the dark area is highlighted in the image, and the bright area is darkened in the image, so that the processed image may present more details in the dark area and the bright area.

It should be understood that both the first front-end processing and the second front-end processing may include the foregoing one or more processing steps. When the first front-end processing or the second front-end processing includes the multiple processing steps, a sequence of the multiple processing steps may be adjusted based on a requirement, which is not limited in this embodiment of this application. In addition, both the first front-end processing and the second front-end processing may further include another step, which may be specifically added as required. This is not limited in this embodiment of this application.

Figure 11:
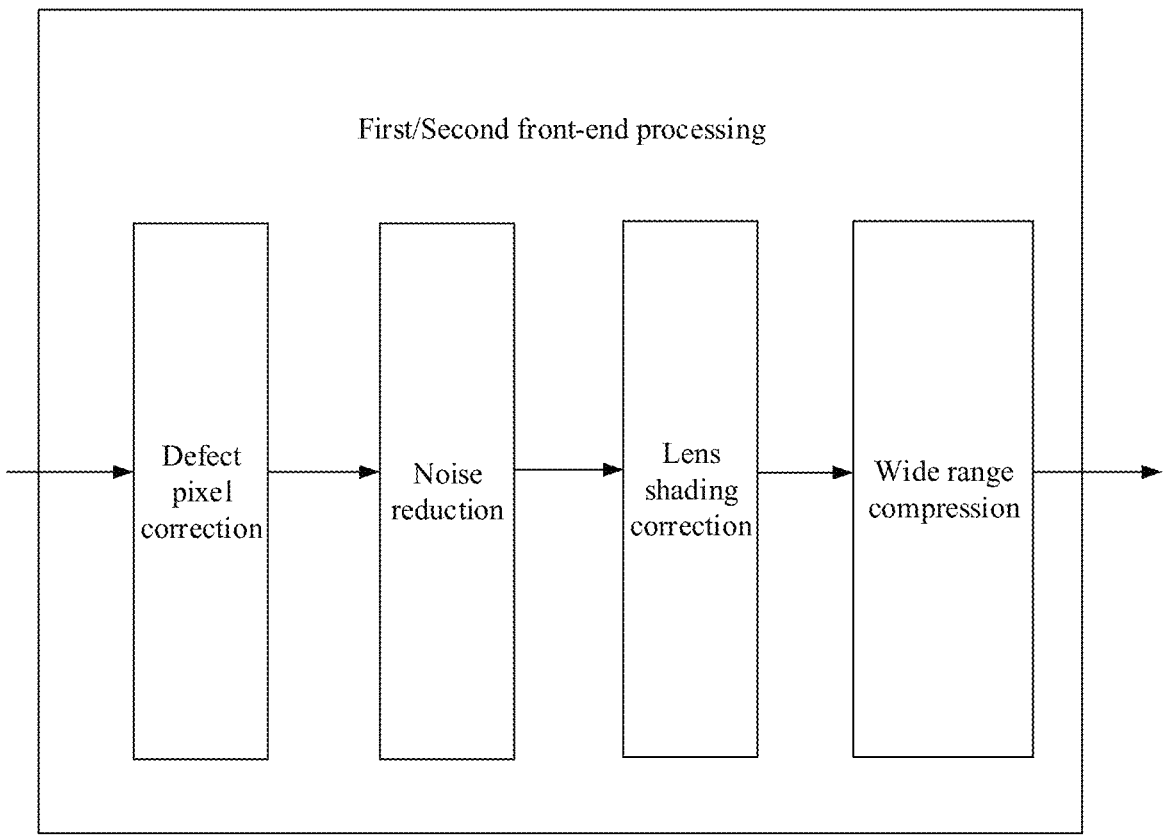
FIG. 11 is a schematic diagram of first front-end processing or second front-end processing according to an embodiment of this application.

FIG. 11 shows a schematic diagram of first front-end processing or second front-end processing.

For example, as shown in FIG. 11, the first front-end processing or the second front-end processing includes, in a processing sequence, defect pixel correction, noise reduction, lens shading correction, and wide range compression.

For example, based on FIG. 11, the first front-end processing and the second front-end processing may further include auto white balance (auto white balance, AWB).

The auto white balance is used to make white present real white in a camera at any color temperature.

Herein, the first front-end processing and the second front-end processing may be the same or different, and may be specifically set and changed based on a requirement. This is not limited in this embodiment of this application.

It should be understood that after the first initial image undergoes the first front-end processing and the second initial image undergoes the second front-end processing, defect pixels in the first initial image and the second initial image are reduced, noise is reduced, colors are balanced, details of a bright area and a dark area are clearer, and a dynamic range is improved, thereby effectively improving quality of the entire image.

S25: In the first image signal processor ISP1, perform first fusion processing on the first front-end processed image and the second front-end processed image to obtain a first fused image located in the RAW domain.

It should be understood that, because both the first front-end processed image and the second front-end processed image are located in the RAW domain, and the first fused image is also located in the RAW domain, it may be learned that the first fusion processing is actually fusion processing in the RAW domain. Fusion processing is performed in the RAW domain, and more details of the image may be retained.

S26: In the first image signal processor ISP1, perform first back-end processing on the first fused image located in the RAW domain to obtain a target image located in a YUV domain.

Optionally, the first back-end processing may include: color correction matrix (color correction matrix, CCM) and conversion from the RGB domain into the YUV domain.

The color correction is used to calibrate accuracy of colors except white. It should be understood that, a color correction process is equivalent to converting an image in the RAW domain into the RGB domain, and the image in the RGB domain is a color image in which each pixel includes a red channel signal, a green channel signal, and a blue channel signal.

The conversion from the RGB domain into the YUV domain is used for converting an image located in the RGB domain to the YUV domain.

Optionally, the first back-end processing may further include at least one of Gamma (Gamma) correction or style change (3 dimensional look up table, 3DLUT).

The Gamma correction is used to adjust brightness, contrast, a dynamic range, and the like of an image by adjusting a Gamma curve. The style change indicates a style change of a color, that is, a color filter is used to change an original image style into another image style, and common styles are, for example, a movie style, a Japanese style, and a shady style.

It should be understood that the first back-end processing may include the foregoing one or more processing steps. When the first back-end processing includes multiple processing steps, a sequence of the multiple processing steps may be adjusted based on a requirement. This is not limited in this embodiment of this application. In addition, the first back-end processing may further include another step, which may be specifically added as required. This is not limited in this embodiment of this application.

Figure 12:
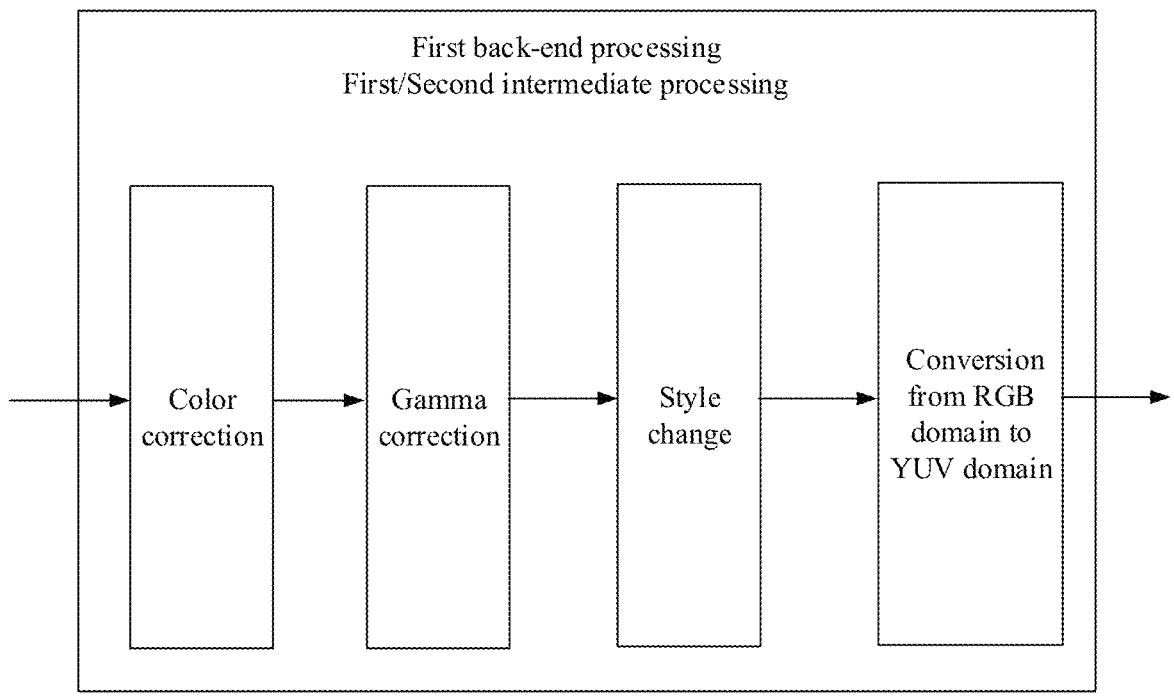
FIG. 12 is a schematic diagram of first back-end processing according to an embodiment of this application.

FIG. 12 shows a schematic diagram of first back-end processing.

For example, as shown in FIG. 12, the first back-end processing includes color correction, Gamma correction, style change, and conversion from RGB domain to YUV domain in a processing sequence.

It should be understood that, after the first back-end processing is performed, the first fused image is converted from the RAW domain to the YUV domain, which can reduce an amount of subsequently transmitted data and save bandwidth.

It should be further understood that the target image is located in the YUV domain. The target image may be used as a photographed image to be displayed on the interface of the electronic device 100, or only stored, which may be specifically set as required. This is not limited in this embodiment of this application.

In this embodiment, based on the first initial image and the second initial image that include different channel signals, in a same image signal processor, the first initial image and the second initial image undergo front-end processing before RAW domain fusion, and then first back-end processing is performed on the first fused image, so that the first fused image is converted from the RAW domain to the YUV domain. Then, the target image in the YUV domain that is obtained after the first back-end processing is output from the image signal processor. Before fusion is performed in the RAW domain, each initial image includes a different channel signal and undergoes a series of processing, and more details are reserved for fusion in the RAW domain, so that maximum restoration of an image color and optimal performance of a signal-to-noise ratio can be implemented.

It should be further understood that the foregoing process is only an example, and the sequence may be specifically adjusted according to a requirement. Certainly, steps may be added or reduced, which is not limited in this embodiment of this application.

Embodiment 2b

Figure 9:
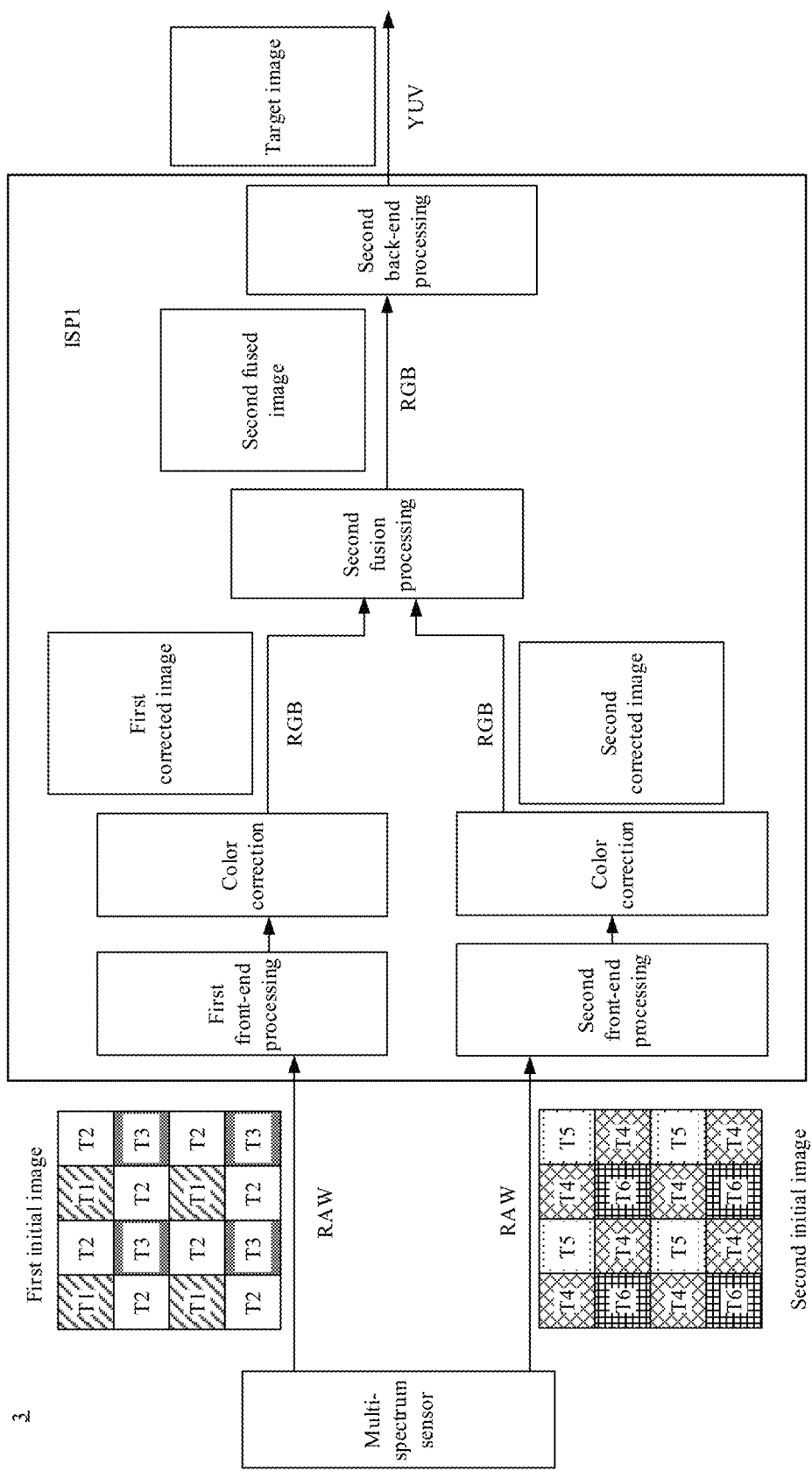
FIG. 9 is a schematic flowchart of another image processing method according to an embodiment of this application.

FIG. 9 is a schematic flowchart of an image processing method according to an embodiment of this application. As shown in FIG. 9, an embodiment of this application provides an image processing method 3. The image processing method 3 includes the following S21 to S26.

S31: Display a preview interface, where the preview interface includes a first control.

S32: Detect a first operation on the first control.

Descriptions of the first control and the first operation is the same as the foregoing descriptions in S11 and S12, and details are not described herein again.

S33: In response to the first operation, obtain a first initial image and a second initial image by using a multi-spectral sensor, where channel signals included in the first initial image and the second initial image are different.

Descriptions of the first initial image and the second initial image are the same as those in the foregoing S23, and are not described herein again. The first initial image and the second initial image are only an example provided in this embodiment of this application.

S34: In a first image signal processor (ISP1 shown in FIG. 9), perform first front-end processing on the first initial image to obtain a first front-end processed image located in a RAW domain; and in the first image signal processor, perform second front-end processing on the second initial image to obtain a second front-end processed image located in the RAW domain.

Descriptions of the first front-end processed image and the second front-end processed image are the same as those in the foregoing S24, and are not described herein again.

S35: In the first image signal processor ISP1, perform color correction on the first front-end processed image to obtain a first corrected image located in an RGB domain; and in the first image signal processor, perform color correction on the second front-end processed image to obtain a second corrected image located in the RGB domain.

The color correction is used to calibrate accuracy of colors except white. It should be understood that, a color correction process is equivalent to converting an image in the RAW domain into the RGB domain, and the image in the RGB domain is a color image in which each pixel includes a red channel signal, a green channel signal, and a blue channel signal.

It should be understood that both the first front-end processed image and the second front-end processed image are located in the RAW domain, and color correction is equivalent to performing processing of conversion from the RAW domain to the RGB domain. Therefore, both the first corrected image and the second corrected image are located in the RGB domain.

S36: In the first image signal processor ISP1, perform second fusion processing on the first corrected image in the RGB domain and the second corrected image in the RGB domain, to obtain a second fused image in the RGB domain.

The second fused image is also located in the RGB domain. Therefore, it may be learned that the second fusion processing is actually fusion processing in the RGB domain. RAW domain images that include signals of different channels are converted into an RGB domain of a same standard, and then fusion is performed, which facilitates processing an image in a same color space, to obtain an optimal effect of the RGB color space.

S37: In the first image signal processor ISP1, perform second back-end processing on the second fused image in the RGB domain to obtain a target image located in the YUV domain.

Optionally, the second back-end processing may include conversion from the RGB domain to a YUV domain.

The conversion from the RGB domain into the YUV domain is used for converting an image located in the RGB domain to the YUV domain.

Optionally, the second back-end processing may further include at least one of Gamma correction and style change.

Descriptions of the Gamma correction and the style change are the same as those in the foregoing S26, and are not described herein again.

It should be understood that the second back-end processing may include the foregoing one or more processing steps. When the second back-end processing includes multiple processing steps, a sequence of the multiple processing steps may be adjusted based on a requirement, which is not limited in this embodiment of this application. In addition, the second back-end processing may further include another step, which may be specifically added as required. This is not limited in this embodiment of this application.

Figure 13:
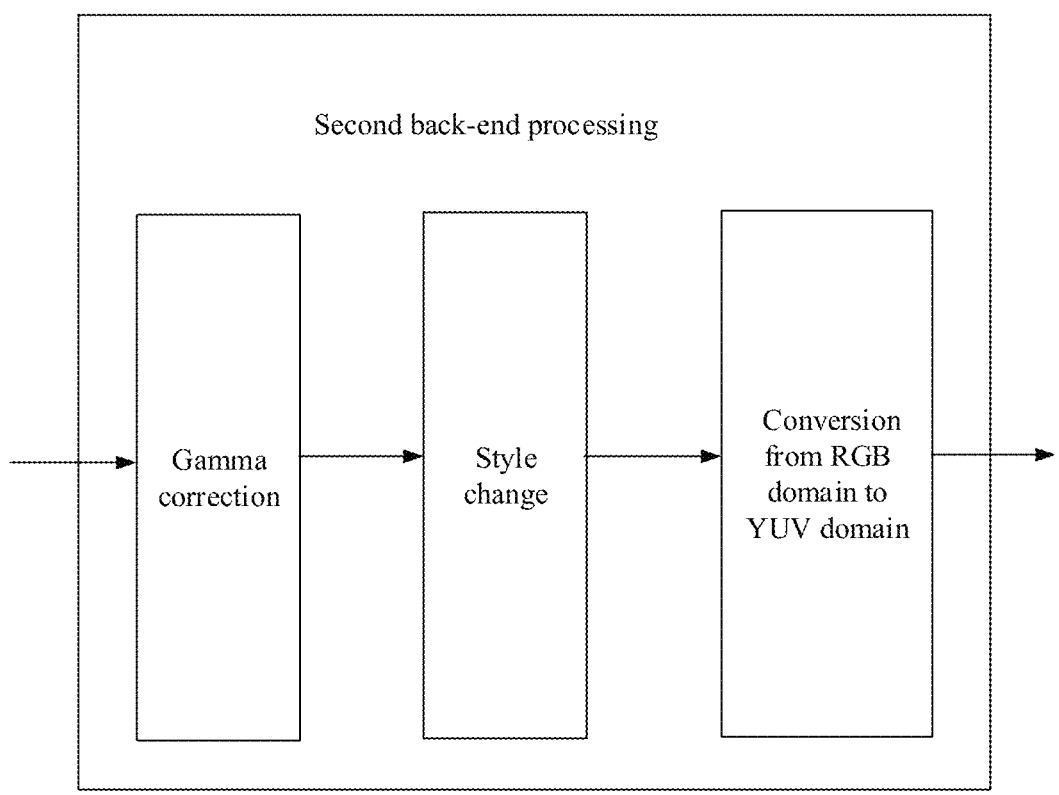
FIG. 13 is a schematic diagram of second back-end processing according to an embodiment of this application.

FIG. 13 shows a schematic diagram of second back-end processing.

For example, as shown in FIG. 13, the second back-end processing includes Gamma correction, style change, and conversion from RGB domain to YUV domain in a processing sequence.

It should be understood that, after the second back-end processing is performed, the second fused image is converted from the RGB domain to the YUV domain, which can reduce an amount of subsequently transmitted data and save bandwidth.

It should be further understood that the target image is located in the YUV domain. The target image may be used as a photographed image to be displayed on the interface of the electronic device 100, or only stored, which may be specifically set as required. This is not limited in this embodiment of this application.

In this embodiment, based on the first initial image and the second initial image that include different channel signals, in a same image signal processor, the first initial image and the second initial image first undergo front-end processing and color correction before RGB domain fusion is performed, and then second back-end processing is performed on the second fused image, so that the second fused image is converted from the RGB domain to the YUV domain. Then the target image that is in the YUV domain and that is obtained after second back-end processing is output from the image signal processor. Before the RGB domain fusion, the initial images each contain different channel signals and undergo a series of processing and color correction, so that maximum restoration of an image color and optimal performance of a signal-to-noise ratio can be implemented.

It should be further understood that the foregoing process is only an example, and the sequence may be specifically adjusted according to a requirement. Certainly, steps may be added or reduced, which is not limited in this embodiment of this application.

Embodiment 2c

Figure 10:
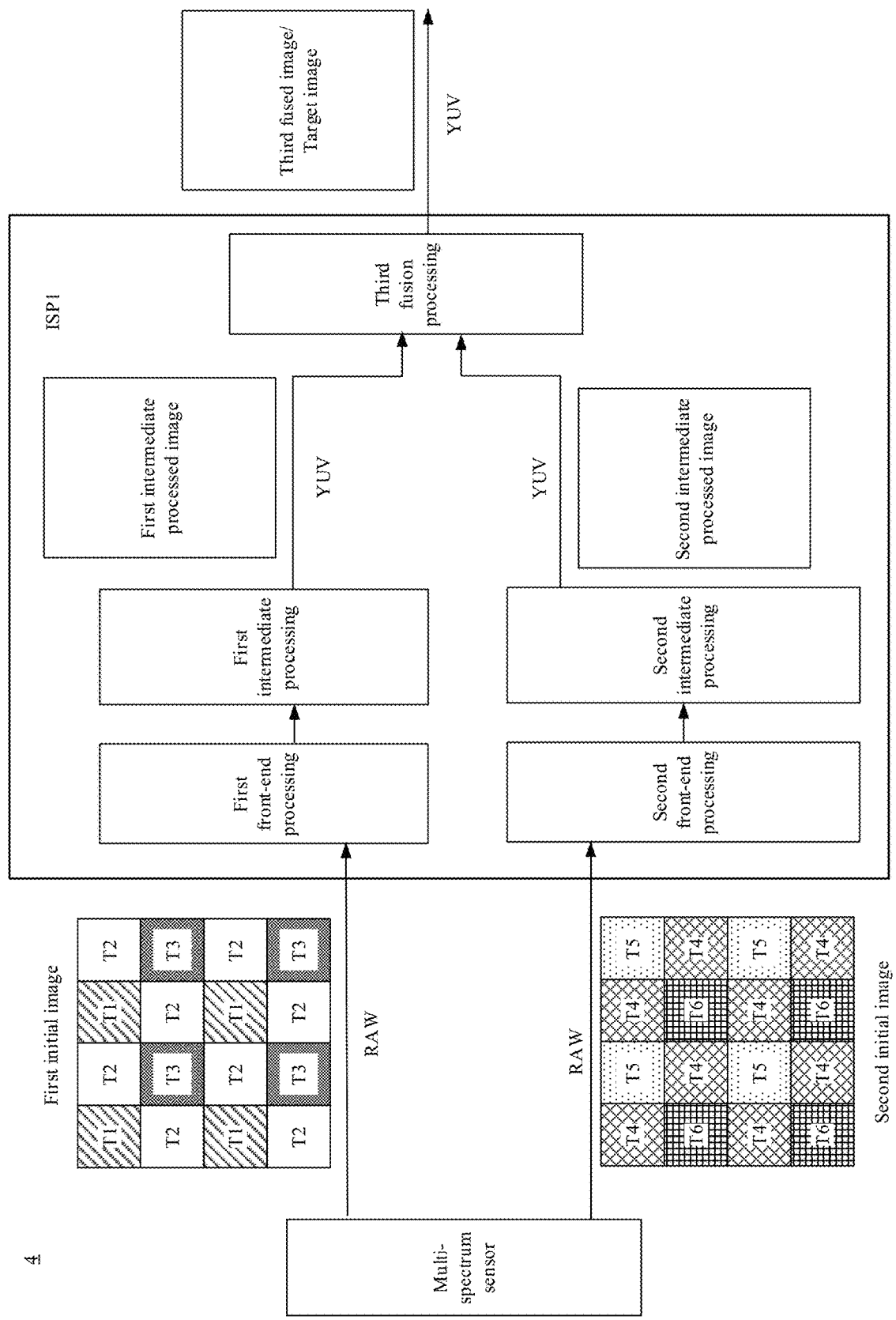
FIG. 10 is a schematic flowchart of still another image processing method according to an embodiment of this application.

FIG. 10 is a schematic flowchart of an image processing method according to an embodiment of this application. As shown in FIG. 10, an embodiment of this application provides an image processing method 4. The image processing method 4 includes the following S41 to S46.

S41: Display a preview interface, where the preview interface includes a first control.

S42: Detect a first operation on the first control.

Descriptions of the first control and the first operation is the same as the foregoing descriptions in S11 and S12, and details are not described herein again.

S43: In response to the first operation, obtain a first initial image and a second initial image by using a multi-spectral sensor, where channel signals included in the first initial image and the second initial image are different.

Descriptions of the first initial image and the second initial image are the same as those in the foregoing S23, and are not described herein again. The first initial image and the second initial image are only an example provided in this embodiment of this application.

S44: In a first image signal processor (ISP1 shown in FIG. 10), perform first front-end processing on the first initial image to obtain a first front-end processed image located in a RAW domain; and in the first image signal processor, perform second front-end processing on the second initial image to obtain a second front-end processed image located in the RAW domain.

Descriptions of the first front-end processed image and the second front-end processed image are the same as those in the foregoing S24, and are not described herein again.

S45: In the first image signal processor ISP1, perform first intermediate processing on the first front-end processed image to obtain a first intermediate processed image located in a YUV domain; and in the first image signal processor, perform second intermediate processing on the second front-end processed image to obtain a second intermediate processed image located in the YUV domain.

Optionally, both the first intermediate processing and the second intermediate processing may include color correction and conversion from the RGB domain to the YUV domain.

The color correction is used to calibrate accuracy of colors except white. It should be understood that, a color correction process is equivalent to converting an image in the RAW domain into the RGB domain, and the image in the RGB domain is a color image in which each pixel includes a red channel signal, a green channel signal, and a blue channel signal.

The conversion from the RGB domain into the YUV domain is used for converting an image located in the RGB domain to the YUV domain.

It should be understood that both the first front-end processed image and the second front-end processed image are located in the RAW domain, and color correction is equivalent to performing processing of conversion from the RAW domain to the RGB domain and then conversion from the RGB domain to the YUV domain, which is equivalent to converting the first front-end processed image from the RAW domain to the YUV domain, and converting the second front-end processed image from the RAW domain to the YUV domain, so that both the obtained first intermediate processed image and the second intermediate processed image are located in the YUV domain.

Optionally, both the first intermediate processing and the second intermediate processing may further include at least one of Gamma correction or style change.

Descriptions of the Gamma correction and the style change are the same as those in the foregoing S26, and are not described herein again.

It should be understood that the first intermediate processing and the second intermediate processing may include the foregoing one or more processing steps. When the first intermediate processing and the second intermediate processing include the multiple processing steps, a sequence of the multiple processing steps may be adjusted based on a requirement, which is not limited in this embodiment of this application. In addition, both the first intermediate processing and the second intermediate processing may further include another step, which may be specifically added as required. This is not limited in this embodiment of this application.

For example, as shown in FIG. 12, the first intermediate processing and the second intermediate processing are the same as the first back-end processing, and include color correction, Gamma correction, style change, and conversion from RGB domain to YUV domain in a processing sequence.

Herein, the first intermediate processing and the second intermediate processing may be the same or different, and may be specifically set and changed based on a requirement. This is not limited in this embodiment of this application.

S46: In the first image signal processor ISP1, perform third fusion processing on the first intermediate processed image in the YUV domain and the second intermediate processed image in the YUV domain to obtain a third fused image in the YUV domain, where the third fused image is a target image.

The third fused image is also located in the YUV domain. Therefore, it may be learned that the third fusion processing is actually fusion processing in the YUV domain. Fusion processing is performed in the YUV domain, and a data volume is small, and a processing speed is faster.

It should be further understood that the target image, that is, the third fused image, may be used as the photographed image to be displayed on the interface of the electronic device 100, or may be stored only, which may be specifically set as required. This is not limited in this embodiment of this application.

In this embodiment, based on the first initial image and the second initial image that include different channel signals, in a same image signal processor, front-end processing and intermediate processing are separately performed before YUV domain fusion is performed, and then the target image that is located in the YUV domain after YUV domain fusion is directly output from the image signal processor. Before the YUV domain fusion, the initial images each contain different channel signals and undergo a series of processing and color correction, so that maximum restoration of an image color and optimal performance of a signal-to-noise ratio can be implemented.

It should be further understood that the foregoing process is only an example, and the sequence may be specifically adjusted according to a requirement. Certainly, steps may be added or reduced, which is not limited in this embodiment of this application.

Embodiment 3a

Figure 14:
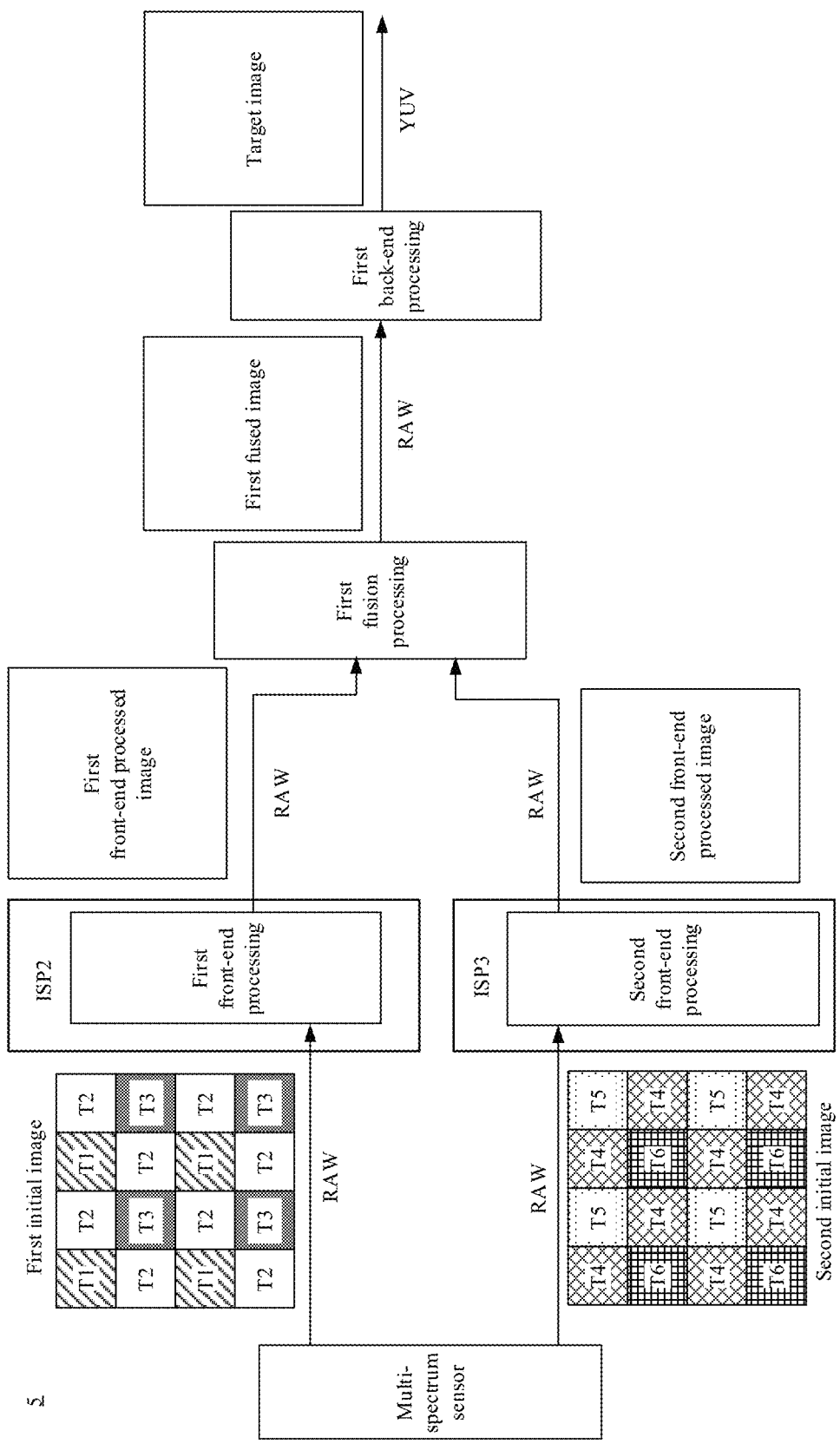
FIG. 14 is a schematic flowchart of still another image processing method according to an embodiment of this application.

FIG. 14 is a schematic flowchart of an image processing method according to an embodiment of this application. As shown in FIG. 14, an embodiment of this application provides an image processing method 5. The image processing method 5 includes the following S51 to S56.

S51: Display a preview interface, where the preview interface includes a first control.

S52: Detect a first operation on the first control.

Descriptions of the first control and the first operation are the same as those in the foregoing S11 and S12, and are not described herein again.

S53: In response to the first operation, obtain a first initial image and a second initial image by using a multi-spectral sensor, where channel signals included in the first initial image and the second initial image are different.

Descriptions of the first initial image and the second initial image are the same as those in the foregoing S23, and are not described herein again. The first initial image and the second initial image are only an example provided in this embodiment of this application.

S54: In a second image signal processor (ISP2 shown in FIG. 14), perform first front-end processing on the first initial image to obtain a first front-end processed image located in a RAW domain, and output the first front-end processed image; and in a third image signal processor (ISP3 shown in FIG. 14), perform second front-end processing on the second initial image, to obtain a second front-end processed image located in the RAW domain, and output the second front-end processed image.

Descriptions of the first front-end processed image and the second front-end processed image are the same as those in the foregoing S24, and are not described herein again. To obtain a better color restoration effect for subsequent fusion processing in the image processing procedure, the first front-end processing and the second front-end processing need to be performed in the two image signal processors respectively.

S55: Perform first fusion processing on the first front-end processed image and the second front-end processed image to obtain a first fused image located in the RAW domain.

The first fusion processing is actually fusion processing in the RAW domain.

S56: Perform first back-end processing on the first fused image located in the RAW domain to obtain a target image located in a YUV domain.

A description of the first back-end processing is the same as that in the foregoing S26, and details are not described herein again.

It should be understood that the first fusion processing and the first back-end processing may be performed in the second image signal processor ISP2, or may be performed in the third image signal processor ISP3. Certainly, the first fusion processing and the first back-end processing may be performed in another image signal processor, which is not limited in this embodiment of this application.

It should be further understood that the target image may be used as a photographed image to be displayed on the interface of the electronic device 100, or only stored, which may be specifically set as required. This is not limited in this embodiment of this application.

In this embodiment, front-end processing is performed in different image signal processors based on the first initial image and the second initial image that include different channel signals. Then, RAW domain fusion is performed on front-end processed images output from the different image signal processors. Then, first back-end processing is performed on the first fused image, so that the first fused image is converted from the RAW domain to the YUV domain. Before fusion is performed in the RAW domain, each initial image includes a different channel signal and undergoes a series of processing, and more details are reserved for fusion in the RAW domain, so that maximum restoration of an image color and optimal performance of a signal-to-noise ratio can be implemented.

It should be further understood that the foregoing process is only an example, and the sequence may be specifically adjusted according to a requirement. Certainly, steps may be added or reduced, which is not limited in this embodiment of this application.

Embodiment 3b

Figure 15:
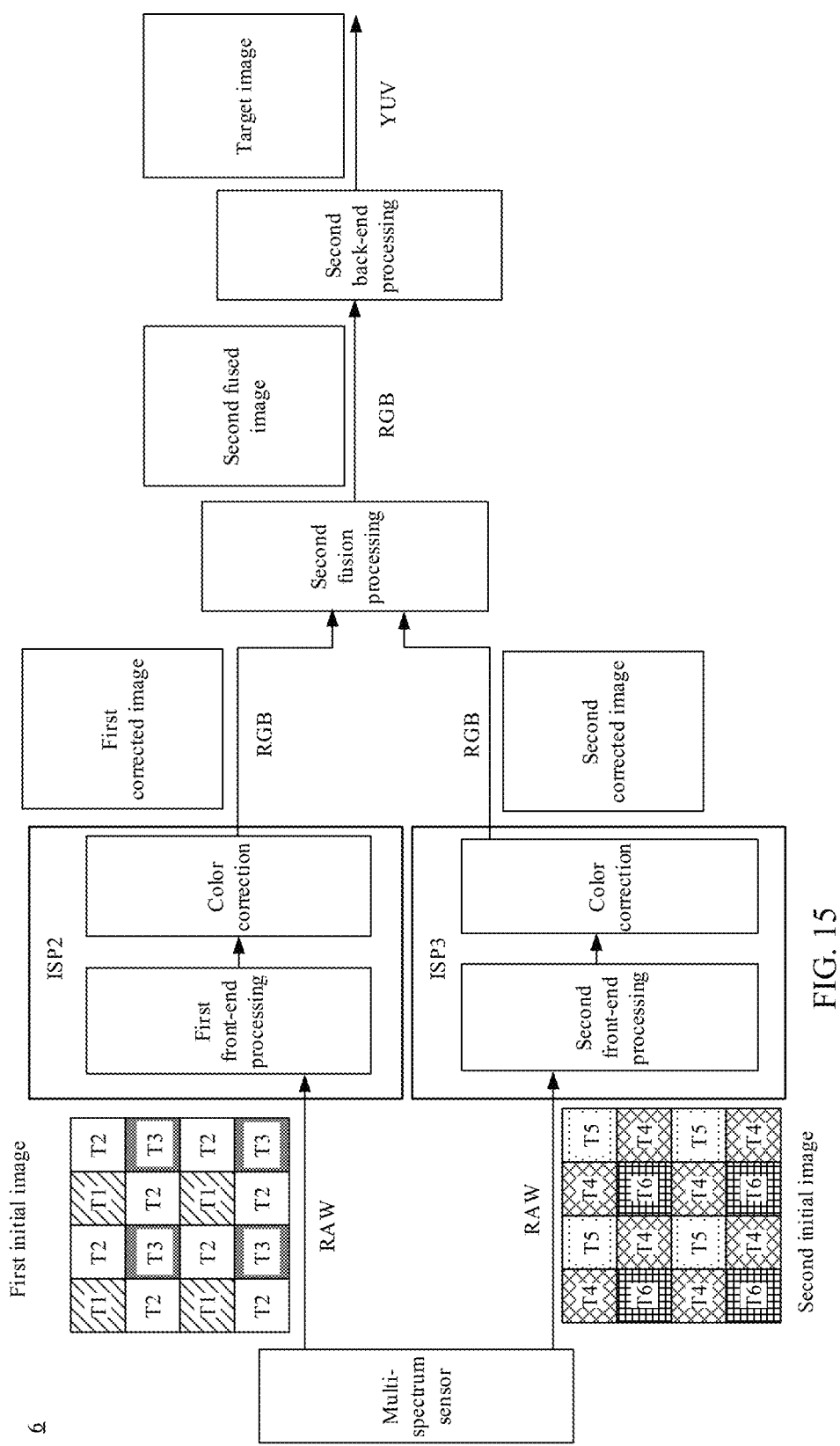
FIG. 15 is a schematic flowchart of still another image processing method according to an embodiment of this application.

FIG. 15 is a schematic flowchart of an image processing method according to an embodiment of this application. As shown in FIG. 15, an embodiment of this application provides an image processing method 6. The image processing method 6 includes the following S61 to S67.

S61: Display a preview interface, where the preview interface includes a first control.

S62: Detect a first operation on the first control.

Descriptions of the first control and the first operation is the same as the foregoing descriptions in S11 and S12, and details are not described herein again.

S63: In response to the first operation, obtain a first initial image and a second initial image by using a multi-spectral sensor, where channel signals included in the first initial image and the second initial image are different.

Descriptions of the first initial image and the second initial image are the same as those in the foregoing S23, and are not described herein again. The first initial image and the second initial image are only an example provided in this embodiment of this application.

S64: In a second image signal processor (ISP2 shown in FIG. 15), perform first front-end processing on the first initial image to obtain a first front-end processed image located in a RAW domain; and in a third image signal processor (ISP3 shown in FIG. 15), perform second front-end processing on the second initial image, to obtain a second front-end processed image located in the RAW domain.

Descriptions of the first front-end processed image and the second front-end processed image are the same as those in the foregoing S24, and are not described herein again.

S65: In the second image signal processor ISP2, perform color correction on the first front-end processed image to obtain a first corrected image located in an RGB domain, and output the first corrected image; and in the third image signal processor ISP3, perform color correction on the second front-end processed image to obtain a second corrected image located in the RGB domain and output the second corrected image.

A description of color correction is the same as the description of color correction in FIG. 9. Details are not described herein again.

S66: Perform second fusion processing on the first corrected image in the RGB domain and the second corrected image in the RGB domain, to obtain a second fused image in the RGB domain.

The second fused image is also located in the RGB domain. Therefore, it may be learned that the second fusion processing is actually fusion processing in the RGB domain. RAW domain images that include signals of different channels are converted into an RGB domain of a same standard, and then fusion is performed, which facilitates processing an image in a same color space, to obtain an optimal effect of the RGB color space.

S67: In the first image signal processor ISP1, perform second back-end processing on the second fused image in the RGB domain to obtain a target image located in the YUV domain.

A description of the second back-end processing is the same as that in the foregoing S37, and details are not described herein again.

It should be understood that the second fusion processing and the second back-end processing may be performed in the second image signal processor ISP2, or may be performed in the third image signal processor ISP3. Certainly, the second fusion processing and the second back-end processing may be performed in another image signal processor, which is not limited in this embodiment of this application.

It should be further understood that the target image may be used as a photographed image to be displayed on the interface of the electronic device 100, or only stored, which may be specifically set as required. This is not limited in this embodiment of this application.

In this embodiment, based on the first initial image and the second initial image that include different channel signals, front-end processing and color correction are separately performed in different image signal processors. Then, RGB domain fusion is performed on the corrected images output from the different image signal processors. Then, second back-end processing is performed on the second fused image, so that the second fused image is converted from the RGB domain to the YUV domain. Before the RGB domain fusion, the initial images each contain different channel signals and undergo a series of processing and color correction, so that maximum restoration of an image color and optimal performance of a signal-to-noise ratio can be implemented.

It should be further understood that the foregoing process is only an example, and the sequence may be specifically adjusted according to a requirement. Certainly, steps may be added or reduced, which is not limited in this embodiment of this application.

Embodiment 3c

Figure 16:
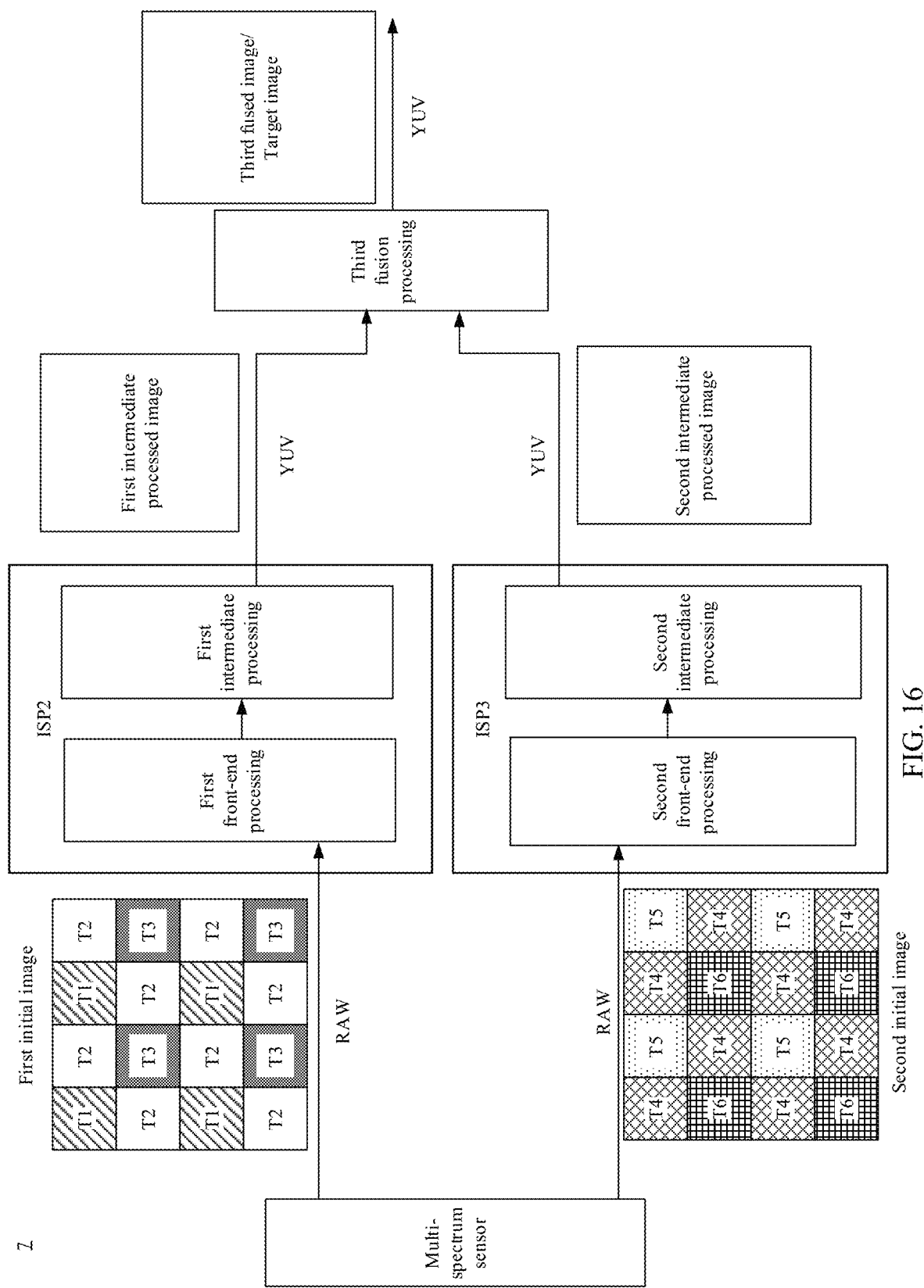
FIG. 16 is a schematic flowchart of still another image processing method according to an embodiment of this application.

FIG. 16 is a schematic flowchart of an image processing method according to an embodiment of this application. As shown in FIG. 16, an embodiment of this application provides an image processing method 7. The image processing method 7 includes the following S71 to S76.

S71: Display a preview interface, where the preview interface includes a first control.

S72: Detect a first operation on the first control.

Descriptions of the first control and the first operation is the same as the foregoing descriptions in S11 and S12, and details are not described herein again.

S73: In response to the first operation, obtain a first initial image and a second initial image by using a multi-spectral sensor, where channel signals included in the first initial image and the second initial image are different.

Descriptions of the first initial image and the second initial image are the same as those in the foregoing S23, and are not described herein again. The first initial image and the second initial image are only an example provided in this embodiment of this application.

S74: In a second image signal processor (ISP2 shown in FIG. 16), perform first front-end processing on the first initial image to obtain a first front-end processed image located in a RAW domain; and in a third image signal processor (ISP3 shown in FIG. 16), perform second front-end processing on the second initial image, to obtain a second front-end processed image located in the RAW domain.

Descriptions of the first front-end processed image and the second front-end processed image are the same as those in the foregoing S24, and are not described herein again.

S75: In the second image signal processor ISP2, perform first intermediate processing on the first front-end processed image to obtain a first intermediate processed image located in a YUV domain, and output the first intermediate processed image; and in the third image signal processor ISP3, perform second intermediate processing on the second front-end processed image to obtain a second intermediate processed image located in the YUV domain, and output the second intermediate processed image.

Descriptions of the first intermediate processing and the second intermediate processing are the same as the descriptions in the foregoing S45, and are not described herein again.

S76: Perform third fusion processing on the first intermediate processed image in the YUV domain and the second intermediate processed image in the YUV domain to obtain a third fused image in the YUV domain, where the third fused image is a target image.

The third fused image is also located in the YUV domain. Therefore, it may be learned that the third fusion processing is actually fusion processing in the YUV domain. Fusion processing is performed in the YUV domain, and a data volume is small, and a processing speed is faster.

It should be understood that the third fusion processing may be performed in the second image signal processor ISP2, or may be performed in the third image signal processor ISP3. Certainly, the third fusion processing may be performed in another image signal processor. This is not limited in this embodiment of this application.

It should be further understood that the target image, that is, the third fused image, may be used as the photographed image to be displayed on the interface of the electronic device 100, or may be stored only, which may be specifically set as required. This is not limited in this embodiment of this application.

In this embodiment, based on the first initial image and the second initial image that include different channel signals, in different image signal processors, front-end processing and intermediate processing are separately performed to convert the first initial image and the second initial image into intermediate processed images located in the YUV domain. Then, an intermediate processed image output from different image signal processors is fused in the YUV domain to obtain a target image located in the YUV domain. Before the YUV domain fusion, the initial images each contain different channel signals and perform a series of processing and color correction, thereby implementing maximum restoration of image color and optimal performance of signal-to-noise ratio.

It should be further understood that the foregoing process is only an example, and the sequence may be specifically adjusted according to a requirement. Certainly, steps may be added or reduced, which is not limited in this embodiment of this application.

Embodiment 4a

Figure 17:
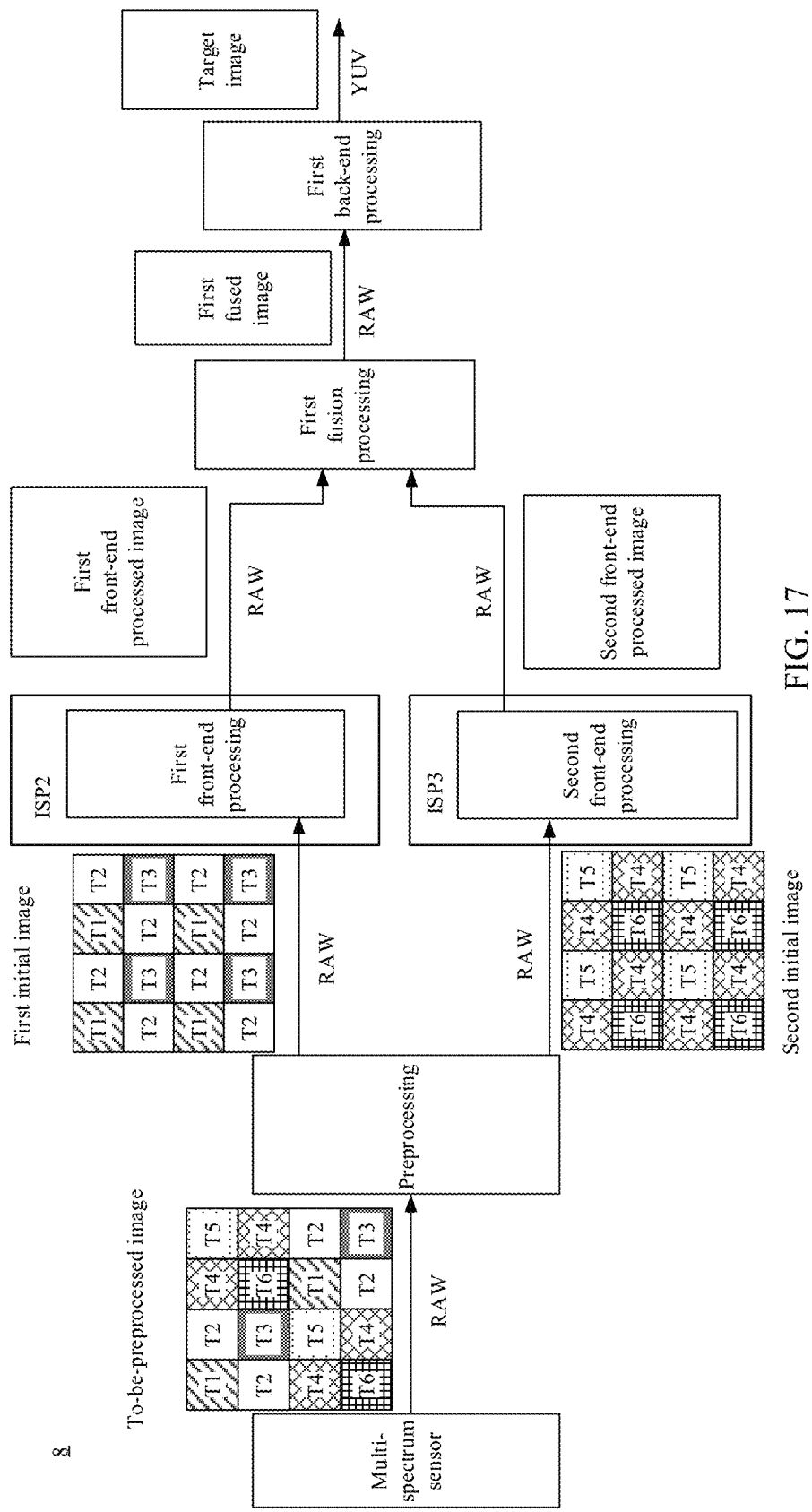
FIG. 17 is a schematic flowchart of still another image processing method according to an embodiment of this application.

With reference to the foregoing Embodiment 3a, this application further provides a schematic flowchart of another image processing method. As shown in FIG. 17, an embodiment of this application provides an image processing method 8.

In the image processing method 8, other processing steps except S53 are the same as those in the image processing method 5 shown in FIG. 14. Details are not described herein again.

In the image processing method 8, the S53 includes the following S531 and S532:

S531: In response to the first operation, obtain a to-be-preprocessed image by using a multi-spectral sensor.

S532: Preprocess the to-be-preprocessed image to obtain a first initial image and a second initial image. The preprocessing is used to convert the channel signal included in the to-be-preprocessed image.

It should be understood that the to-be-preprocessed image includes multiple channel signals, and a quantity of the channel signals is greater than or equal to a sum of channel signals of the first initial image and the second initial image.

Descriptions of the first initial image and the second initial image are the same as those in the foregoing S23, and are not described herein again. Herein, that a channel signal included in a to-be-preprocessed image is equal to a sum of a first initial image and a second initial image is used as an example. When the first initial image includes a red channel signal, a green channel signal, and a blue channel signal, and the second initial image includes a cyan channel signal, a magenta channel signal, and a yellow channel signal, the to-be-preprocessed image obtained by the multi-spectral sensor includes at least six channel signals of different colors, which are respectively a red channel signal, a green channel signal, a blue channel signal, a cyan channel signal, a magenta channel signal, and a yellow channel signal. It should be understood that the foregoing is only an example.

Optionally, the preprocessing may be horizontal direction binning, vertical direction binning, v2h2 binning, or remosaic.

It should be understood that binning refers to adding charge induced by adjacent pixels in the bayer pattern array together to output in one pixel mode. For example, horizontal direction binning refers to adding charge of adjacent rows together to output; Vertical direction binning refers to adding charge of adjacent columns together to output; V2h2 binning refers to adding in both a horizontal direction and a vertical direction. In this way, pixels distributed by 2×2 can be synthesized into 1×1. Therefore, a length and a width of an image are shortened to an original half, and output resolution is reduced to an original quarter.

It should be understood that remosaic also refers to merging four pixels into one pixel, but unlike v2h2 binning, remosaic refers to merging four pixels in a Quadra CFA (Quadra Color Filter array) format into one pixel. In this case, a format of the to-be-preprocessed image is Quadra CFA. Adjacent four pixels in the to-be-preprocessed image in this format are actually corresponding to a channel signal of a same color. Based on this, after remosaic processing is performed, a bayer pattern image may be restored.

Certainly, the preprocessing may be performed in another manner, which is not limited in this embodiment of this application.

It should be understood that the preprocessing may be performed in the second image signal processor ISP2, or may be performed in the third image signal processor ISP3. Certainly, the preprocessing may be performed in another image signal processor. This is not limited in this embodiment of this application.

In addition, subsequent first front-end processing for the first initial image may be performed in the second image signal processor ISP2. Second front-end processing for the second initial image may be performed in the third image signal processor ISP3. Alternatively, first front-end processing for the first initial image and second front-end processing for the second initial image may be performed in one image signal processor. This is not limited in this embodiment of this application.

In this embodiment, the multi-spectral sensor may be configured to: obtain only one frame of the to-be-preprocessed image that includes a relatively large quantity of channel signals, and perform preprocessing on the to-be-preprocessed image, that is, split the to-be-preprocessed images, to obtain the first initial image and the second initial image that include different channel signals; then perform front-end processing on the first initial image and the second initial image that include different channel signals in different image signal processors; then perform RAW domain fusion on the front-end processed images output from the different image signal processors; and then perform first back-end processing on the first fused image, so that the first fused image is converted from the RAW domain to the YUV domain. Before fusion is performed in the RAW domain, each initial image includes a different channel signal and undergoes a series of processing, and more details are reserved for fusion in the RAW domain, so that maximum restoration of an image color and optimal performance of a signal-to-noise ratio can be implemented.

Embodiment 4b

Figure 18:
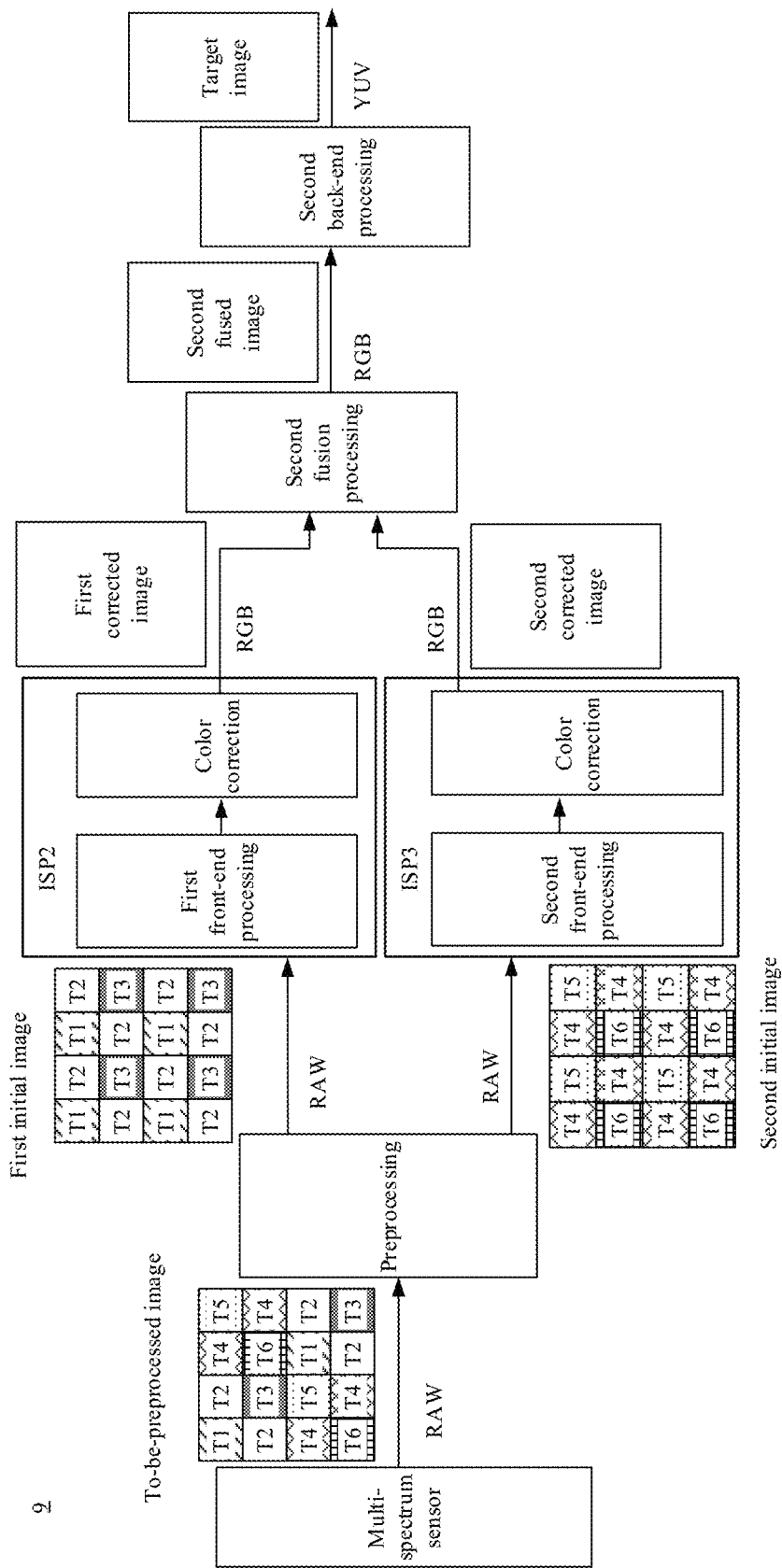
FIG. 18 is a schematic flowchart of still another image processing method according to an embodiment of this application.

With reference to the foregoing Embodiment 3b, this application further provides another schematic flowchart of an image processing method. As shown in FIG. 18, an embodiment of this application provides an image processing method 9.

In the image processing method 9, other processing steps except S63 are the same as those in the image processing method 6 shown in FIG. 15. Details are not described herein again.

In the image processing method 9, S63 may include the following S631 and S632:

S631: In response to the first operation, obtain a to-be-preprocessed image by using a multi-spectral sensor.

S632: Preprocess the to-be-preprocessed image to obtain a first initial image and a second initial image. The preprocessing is used to convert channel signals included in the to-be-preprocessed image.

It should be understood that the to-be-preprocessed image includes multiple channel signals. A quantity of the channel signals is greater than or equal to a sum of channel signals of the first initial image and the second initial image.

Descriptions of the first initial image and the second initial image are the same as those in the foregoing S23, and are not described herein again. Herein, that the channel signals included in the to-be-preprocessed image is equal to the sum of the channel signals of the first initial image and the second initial image is used as an example. When the first initial image includes a red channel signal, a green channel signal, and a blue channel signal, and the second initial image includes a cyan channel signal, a magenta channel signal, and a yellow channel signal, the to-be-preprocessed image obtained by the multi-spectral sensor includes at least six channel signals of different colors, which are respectively a red channel signal, a green channel signal, a blue channel signal, a cyan channel signal, a magenta channel signal, and a yellow channel signal. It should be understood that the foregoing is merely an example.

A description of the preprocessing is the same as the description in the foregoing Embodiment 4a, and details are not described herein again.

It should be understood that the preprocessing may be performed in the second image signal processor ISP2, or may be performed in the third image signal processor ISP3. Certainly, the preprocessing may be performed in another image signal processor. This is not limited in this embodiment of this application.

In addition, subsequent first front-end processing and color correction for the first initial image may be performed in the second image signal processor ISP2. Second front-end processing and color correction for the second initial image may be performed in the third image signal processor ISP3. Alternatively, first front-end processing and color correction for the first initial image and second front-end processing and color correction for the second initial image may be performed in one image signal processor. This is not limited in this embodiment of this application.

In this embodiment, the multi-spectral sensor may be configured to: obtain only one frame of a to-be-preprocessed image that includes a relatively large quantity of channel signals, and perform preprocessing on the to-be-preprocessed image, that is, split the to-be-preprocessed images, to obtain the first initial image and the second initial image that include different channel signals; then perform front-end processing and color correction in different image signal processors; then perform RGB domain fusion on the corrected images output from the different image signal processors; and then perform second back-end processing on the second fused image, so that the second fused image is converted from the RGB domain to the YUV domain. Before the RGB domain fusion, the initial images each contain different channel signals and undergo a series of processing and color correction, so that maximum restoration of an image color and optimal performance of a signal-to-noise ratio can be implemented.

Embodiment 4c

Figure 19:
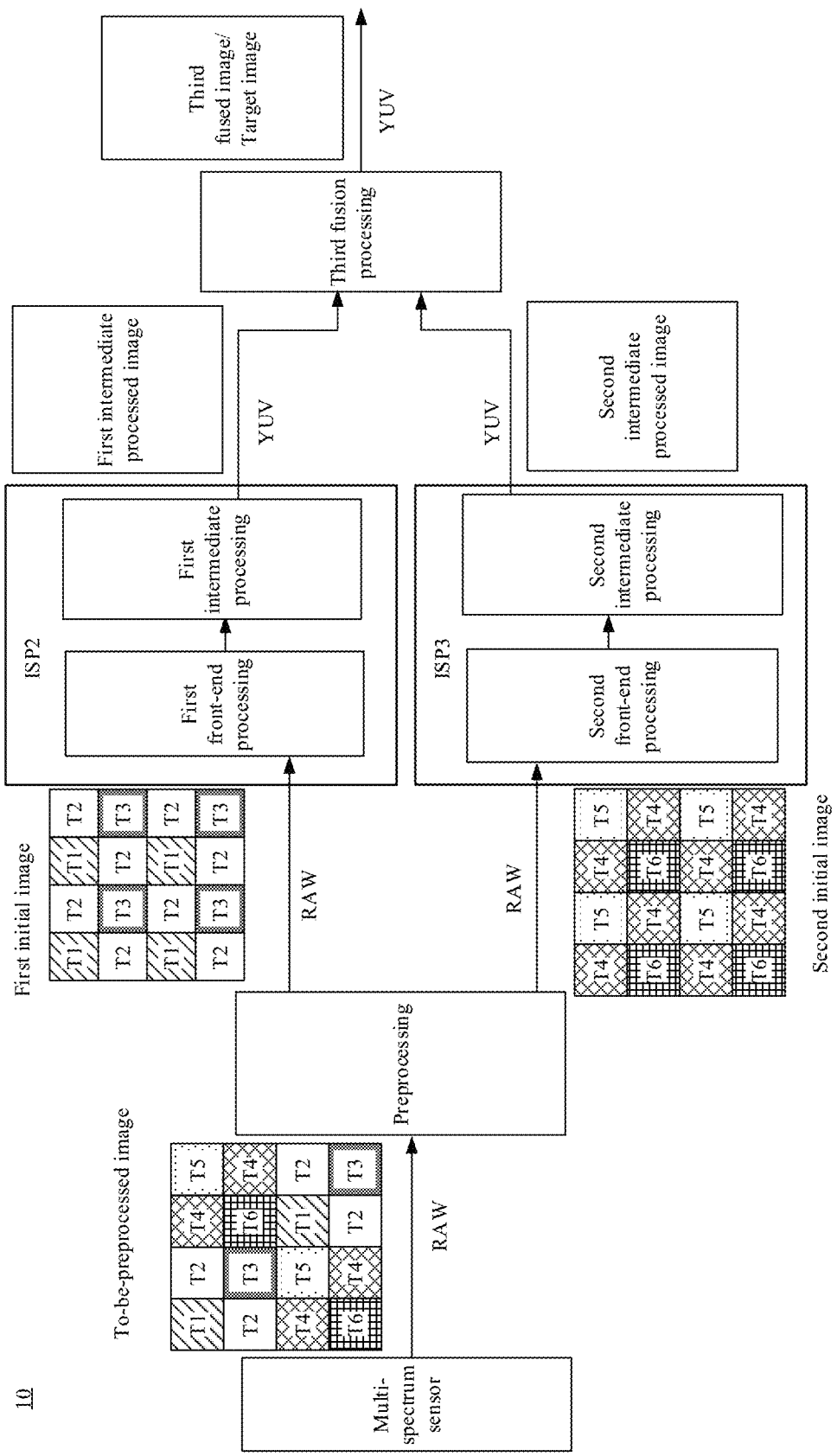
FIG. 19 is a schematic flowchart of still another image processing method according to an embodiment of this application.

With reference to the foregoing Embodiment 3c, this application further provides a schematic flowchart of another image processing method. As shown in FIG. 19, an embodiment of this application provides an image processing method 10.

In the image processing method 10, other processing steps except S73 are the same as those in the image processing method 7 shown in FIG. 16. Details are not described herein again.

In the image processing method 10, S73 may include the following S731 and S732:

S731: In response to the first operation, obtain a to-be-preprocessed image by using a multi-spectral sensor.

S732: Preprocess the to-be-preprocessed image to obtain a first initial image and a second initial image. The preprocessing is used to convert channel signals included in the to-be-preprocessed image.

It should be understood that the to-be-preprocessed image includes multiple channel signals. A quantity of the channel signals is greater than or equal to a sum of channel signals of the first initial image and the second initial image.

Descriptions of the first initial image and the second initial image are the same as those in the foregoing S23, and are not described herein again. Herein, that the channel signals included in the to-be-preprocessed image is equal to the sum of the channel signals of the first initial image and the second initial image is used as an example. When the first initial image includes a red channel signal, a green channel signal, and a blue channel signal, and the second initial image includes a cyan channel signal, a magenta channel signal, and a yellow channel signal, the to-be-preprocessed image obtained by the multi-spectral sensor includes at least six channel signals of different colors, which are respectively a red channel signal, a green channel signal, a blue channel signal, a cyan channel signal, a magenta channel signal, and a yellow channel signal. It should be understood that the foregoing is merely an example.

A description of the preprocessing is the same as the description in the foregoing Embodiment 4a, and details are not described herein again.

In addition, subsequently, the first front-end processing and the first intermediate processing may be performed on the first initial image in the second image signal processor ISP2, and the second front-end processing and the second intermediate processing may be performed on the second initial image in the third image signal processor ISP3; or the first front-end processing and the first intermediate processing for the first initial image and the second front-end processing and the second intermediate processing for the second initial image may be performed in one image signal processor. This is not limited in this embodiment of this application.

In this embodiment, the multi-spectral sensor may be configured to: obtain only one frame of the to-be-preprocessed image that includes a relatively large quantity of channel signals, and perform preprocessing on the to-be-preprocessed image, that is, split the to-be-preprocessed image, so as to obtain the first initial image and the second initial image that include different channel signals; then perform front-end processing and intermediate processing in different image signal processors to convert the images into intermediate processed images located in the YUV domain; then fuse intermediate processed images output from different image signal processors in the YUV domain to obtain a target image located in the YUV domain. Before the YUV domain fusion, the initial images each contain different channel signals and undergo a series of processing and color correction, so that maximum restoration of an image color and optimal performance of a signal-to-noise ratio can be implemented.

Embodiment 5

Figure 20:
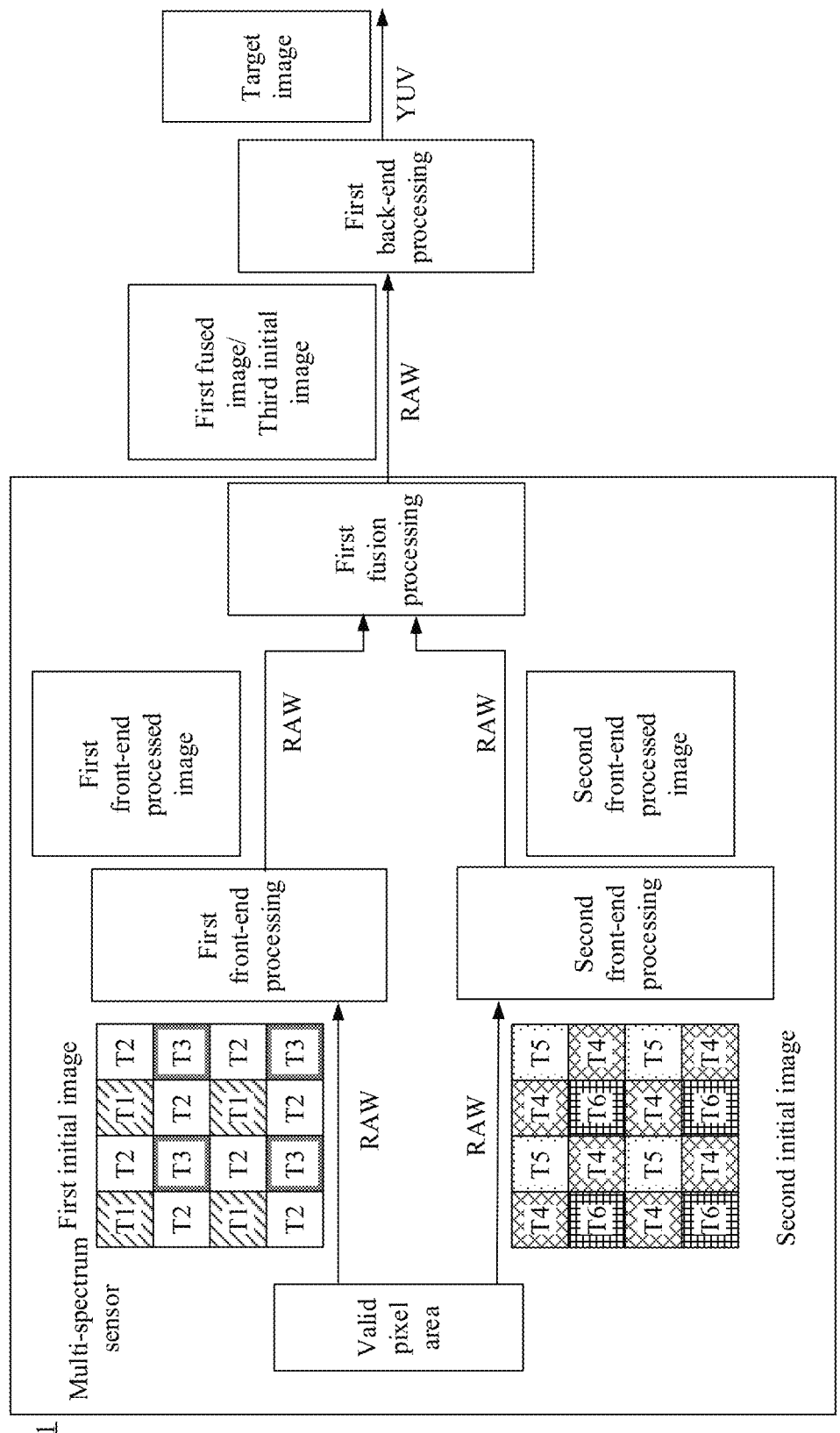
FIG. 20 is a schematic flowchart of still another image processing method according to an embodiment of this application.

FIG. 20 is a schematic flowchart of still another image processing method according to an embodiment of this application. As shown in FIG. 20, an embodiment of this application provides an image processing method 11. The image processing method 11 includes the following S111 to S116.

S111: Display a preview interface, where the preview interface includes a first control.

S112: Detect a first operation on the first control.

Descriptions of the first control and the first operation are the same as those in the foregoing S11 and S12, and are not described herein again.

S113: In response to the first operation, obtain a first initial image and a second initial image by using an effective pixel area in a multi-spectral sensor, where the first initial image and the second initial image include different channel signals.

It should be understood that, generally, a sensor includes one or more rows of pixels that do not participate in light sensing. To avoid affecting a subsequent effect of color restoration, these pixels are excluded, and image signals may be obtained by using only valid pixels in an effective pixel area in which light can be sensed in the multi-spectral sensor. The effective pixel is a pixel that can be sensed in the multi-spectral sensor, and the effective pixel area is an area that includes all the effective pixels in the multi-spectral sensor.

Descriptions of the first initial image and the second initial image are the same as those in the foregoing S23, and are not described herein again. The first initial image and the second initial image are only an example provided in this embodiment of this application.

S114: In the multi-spectral sensor, perform first front-end processing on the first initial image to obtain a first front-end processed image located in a RAW domain; and in the multi-spectral sensor, perform second front-end processing on the second initial image to obtain a second front-end processed image located in the RAW domain.

Descriptions of the first front-end processed image and the second front-end processed image are the same as those in the foregoing S24, and are not described herein again.

S115: In the multi-spectral sensor, perform first fusion processing on the first front-end processed image and the second front-end processed image to obtain a first fused image located in the RAW domain, and output the first fused image.

The first fusion processing is actually fusion processing in the RAW domain.

It should be understood that the first fused image is located in the RAW domain, and after the first fused image is output from the multi-spectral sensor, the first fused image may also be referred to as a third initial image relative to another ISP.

S116: Perform first back-end processing on the first fused image located in the RAW domain to obtain a target image located in a YUV domain.

A description of the first back-end processing is the same as that in the foregoing S26, and details are not described herein again.

It should be understood that the first back-end processing may be performed in a fourth image signal processor ISP4.

It should be understood that a calculation amount of subsequent processing may be reduced by performing first front-end processing, second front-end processing, and first fusion processing in the multi-spectral sensor. For example, when the first back-end processing is performed in the ISP4, if the previous first front-end processing, second front-end processing, and first fusion processing are all performed in the multi-spectral sensor, a subsequent calculation amount of the ISP4 may be reduced, and power consumption is further reduced.

It should be further understood that the target image may be used as a photographed image to be displayed on the interface of the electronic device 100, or only stored, which may be specifically set as required. This is not limited in this embodiment of this application.

In this embodiment, in the multi-spectral sensor, the first initial image and the second initial image that include different channel signals are determined based on the effective pixel area; front-end processing is performed on each of the first initial image and the second initial image in the multi-spectral sensor, and then RAW domain fusion is performed on the images that undergo front-end processing and the fused image is output; then, first back-end processing is performed on the first fused image, so that the first fused image is converted from the RAW domain to the YUV domain. Due to a series of processing and fusion of initial images including different channel signals in the multi-spectral sensor, maximum restoration of an image color and optimal performance of an SNR can be achieved. In addition, a calculation amount of subsequent processing may be reduced, thereby reducing power consumption.

It should be further understood that the foregoing process is only an example, and the sequence may be specifically adjusted according to a requirement. Certainly, steps may be added or reduced, which is not limited in this embodiment of this application.

With reference to the foregoing Embodiment 1 to Embodiment 5, when the first fusion processing, the second fusion processing, or the third fusion processing is performed, to achieve a better fusion effect, the embodiments of this application may further include the following content:

For example, in the image processing method 2, when the multiple frames of initial images include the first initial image and the second initial image that have different channel signals, the first front-end processed image obtained after first front-end processing is performed on the first initial image and the second front-end processed image obtained after second front-end processing is performed on the second initial image are fused by using the following formula (1):

$$I\_f(i,j)=W\_ij \times I\_c(i,j)+(1-W\_ij) \times I\_r(i,j) \tag{1}$$

Herein, (i, j) is pixel coordinates, $I\_c$ (i, j) is the first front-end processed image corresponding to the first initial image, $I\_r$ (i, j) is the second front-end processed image corresponding to the second initial image, $W\_ij$ is a weight allocated to the first front-end processed image corresponding to the first initial image, $1-W\_ij$ is a weight allocated to the second front-end processed image corresponding to the second initial image, and $I\_f$ (i, j) is a fused image, that is, the first fused image.

In this way, two pixels corresponding to a same position in the first front-end processed image and the second front-end processed image are fused by using the foregoing formula, to obtain content of all pixels in the first fused image.

On this basis, to further improve the fusion effect, the weight $W\_ij$ may be further refined. For example, the weight $W\_ij$ may include a light intensity weight, a color temperature weight, and a scenario type weight.

Optionally, the weight $W\_ij$ may be determined by using the following formula (2):

$$W\_ij=Wa\_ij \times para1 + Wb\_ij \times para2 + Wc\_ij \times para3 \tag{2}$$

Herein, $Wa\_ij$ is a light intensity weight, $Wa\_ij=E/E\_standard$, E is illuminance in a photographing environment, and E_standard is preset standard illuminance; $Wb\_ij$ is a color temperature weight, $Wb\_ij=T/T\_standard$, T is a color temperature in a photographing environment, and T_standard is a preset standard color temperature; $Wc\_ij$ is a scenario type weight, and scenario type weights corresponding to different scenario types are different; the scenario types include at least one of Portrait or Landscape; and para1, para2, and para3 are preset parameters.

It should be understood that illuminance E in a photographing environment may be converted by using an auto exposure value (auto exposure value, AE) of automatic exposure. The standard illuminance E_standard may be preset as required. For example, the standard illuminance may be cured in an OTP (one time programmable) memory in a burning manner before the electronic device leaves the factory.

The color temperature T in the photographing environment may be determined by using a color temperature estimation algorithm or may be collected by using a multi-spectral color temperature sensor. The standard color temperature T_standard may be preset as required, for example, may be set to 5000 K.

It should be understood that a type of a scenario type may be set based on a requirement, and a scenario type weight corresponding to different scenario types may also be preset and changed based on a requirement. This is not limited in this embodiment of this application. For example, when the scenario type is portrait, it may be defined that a corresponding scenario type weight value is smaller, so as to improve chromatic deviation. When the scenario type is landscape, a corresponding scenario type weight value may be defined to be larger, so as to improve a signal-to-noise ratio.

It should be understood that the foregoing three weights of the light intensity illuminance weight, the color temperature weight, and the scenario type weight may be coefficients of a global operation. In this case, for each pixel, the three weights are respectively consistent, so that a global operation is implemented.

Certainly, after the image segmentation area is divided, different light intensity weights, color temperature weights, or scene type weights may be allocated to different areas, so as to implement a local operation. The segmentation method may be selected based on a requirement, which is not limited in this embodiment of this application. For example, an area that needs to be processed may be outlined from the processed image in a manner such as a block, a circle, an ellipse, an irregular polygon, and the like as a region of interest (region of interest, ROI), and then different weights are allocated for the region of interest and the non-region of interest.

In addition, for a scenario type weight, when the scenario type is HDR, because of a relatively large difference in image content, a different scenario type weight value may be set for each pixel or sub-region, so as to implement fine adjustment.

The scenario type weight corresponding to HDR may be determined by using the following formula (3):

$$Wc\_ij = (GA\_standard - GA\_ij)/GA\_standard \qquad (3)$$

GA_ij is a grayscale value corresponding to a pixel whose pixel coordinates are (i, j), and GA_standard is a preset standard grayscale value.

It should be understood that if RAW domain fusion is performed, it indicates that two frames of images for fusion are located in the RAW domain. In this case, a Y value corresponding to each pixel is a grayscale value. If YUV domain fusion is performed, it indicates that two frames of images for fusion are located in the YUV domain. In this case, a Y value corresponding to each pixel is a gray value. If fusion is performed in the RGB domain, it indicates that two frames of images for fusion are located in the RGB domain. In this case, a Y value corresponding to each pixel may be determined based on a corresponding three-color pixel value.

For example, when the scenario type is the HDR mode, a gray value corresponding to each pixel may be determined, and then a corresponding scenario type weight is determined by using the foregoing formula (3). Then, a weight W_ij corresponding to each pixel is determined by using the foregoing formula (2).

For example, when the scenario type is the HDR mode, a region of interest and a region of non-interest may be first divided by using a segmentation method. Then, for each region, a scenario type weight corresponding to each pixel may be determined by using the foregoing formula (3), a scenario type weight corresponding to the region is determined by using an average value or in another manner, and then a scenario type weight of an entire image is determined in a weighted manner or in another manner.

It should be understood that the foregoing are only several examples for determining a weight, and may be specifically designed and adjusted based on a requirement. This is not limited in this embodiment of this application.

The foregoing describes in detail the image processing method provided in the embodiments of this application. With reference to a display interface of an electronic device, the following describes how a user enables the image processing method provided in the embodiments of this application.

Figure 21A:
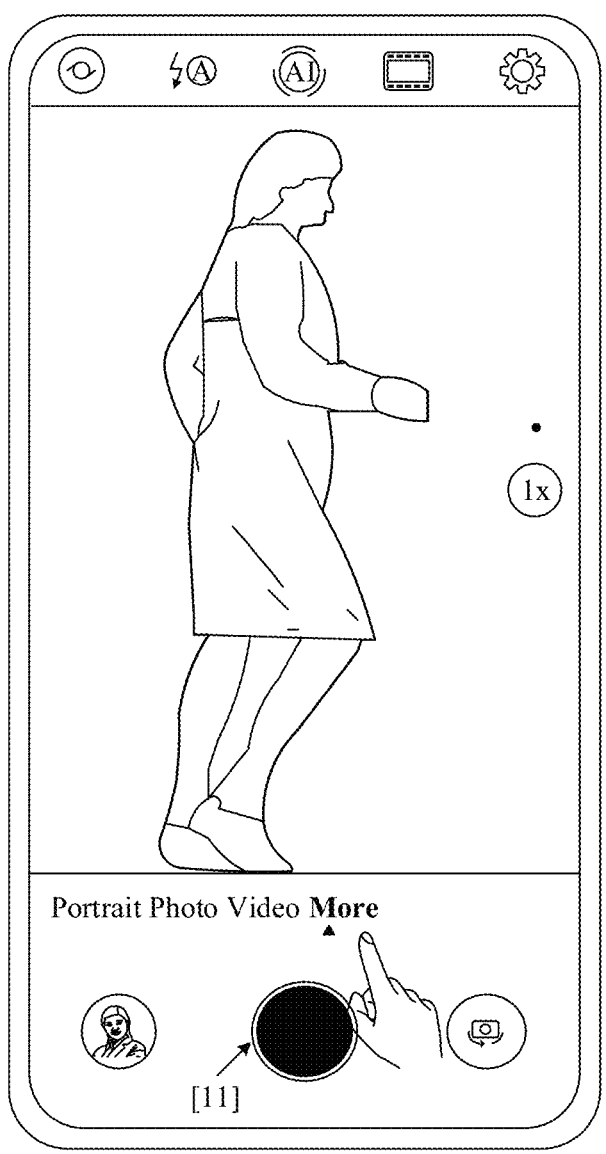
FIG. 21(a) and FIG. 21(b) are a schematic diagram of display interfaces of an electronic device according to an embodiment of this application.
Figure 21B:
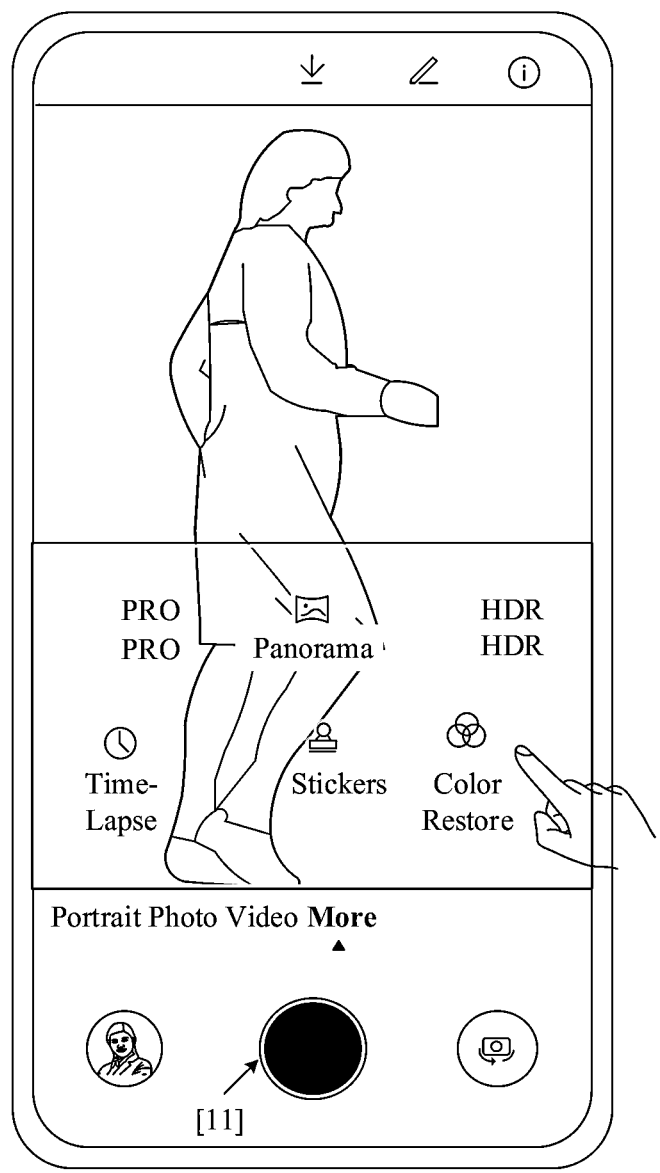

FIG. 21(a) and FIG. 21(b) are a schematic diagram of display interfaces of an electronic device according to an embodiment of this application.

For example, in response to a tap operation of the user, when the electronic device 100 runs the camera application, the electronic device 100 displays the photographing interface shown in FIG. 21(a). The user may perform a slide operation on the interface, so that the photographing button 11 indicates a photographing option "More".

In response to a tap operation performed by the user on the photographing option "More", the electronic device 100 displays a photographing interface shown in FIG. 21(b), and multiple photographing mode options are displayed on the interface, for example, a PRO mode, a Panorama mode, an HDR mode, a Time-Lapse mode, a Stickers mode, and a Color Restore mode. It should be understood that the foregoing photographing mode options are only an example, and may be specifically set and modified according to a requirement. This is not limited in this embodiment of this application.

In response to a tap operation performed by the user in the "Color Restore" mode, the electronic device 100 may start a program related to the image processing method provided in this embodiment of this application during image shooting.

Figure 22A:
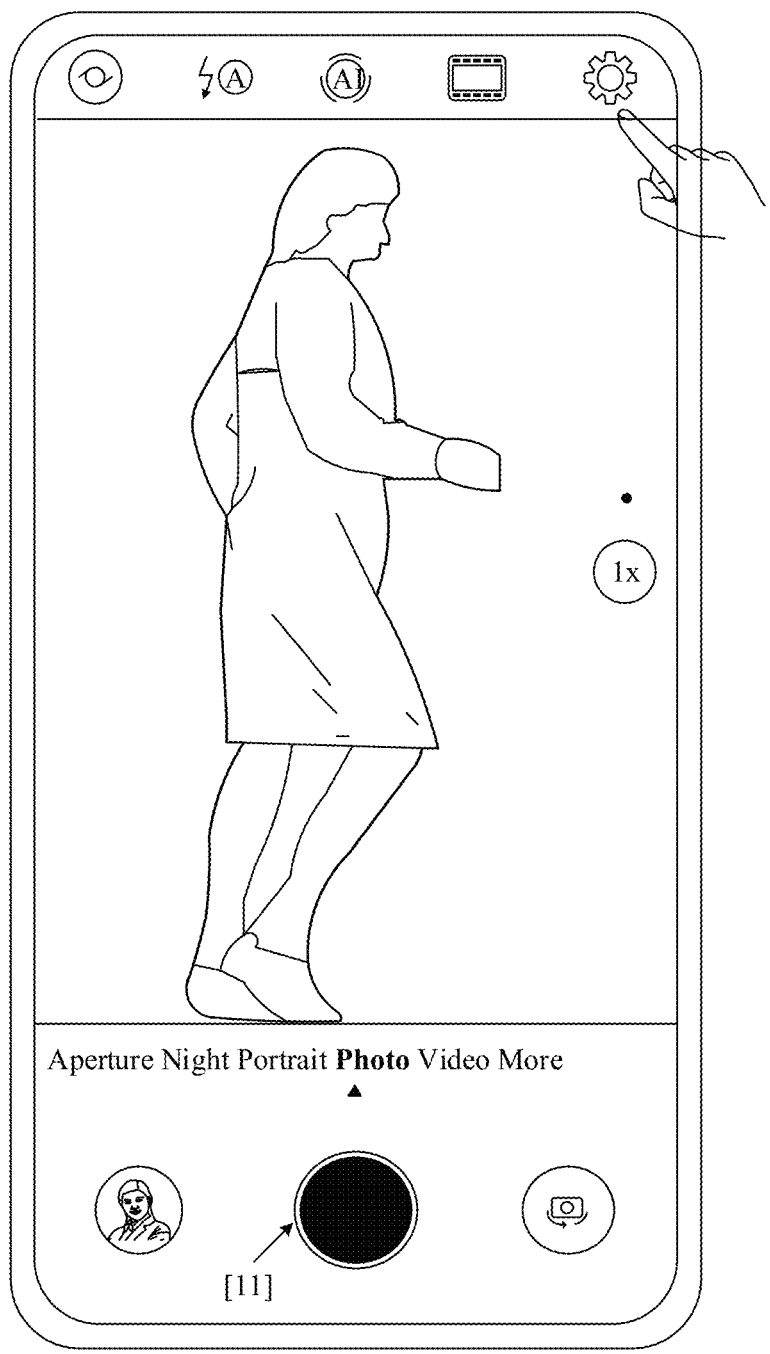
FIG. 22(a) and FIG. 22(b) are a schematic diagram of display interfaces of another electronic device according to an embodiment of this application.
Figure 22B:
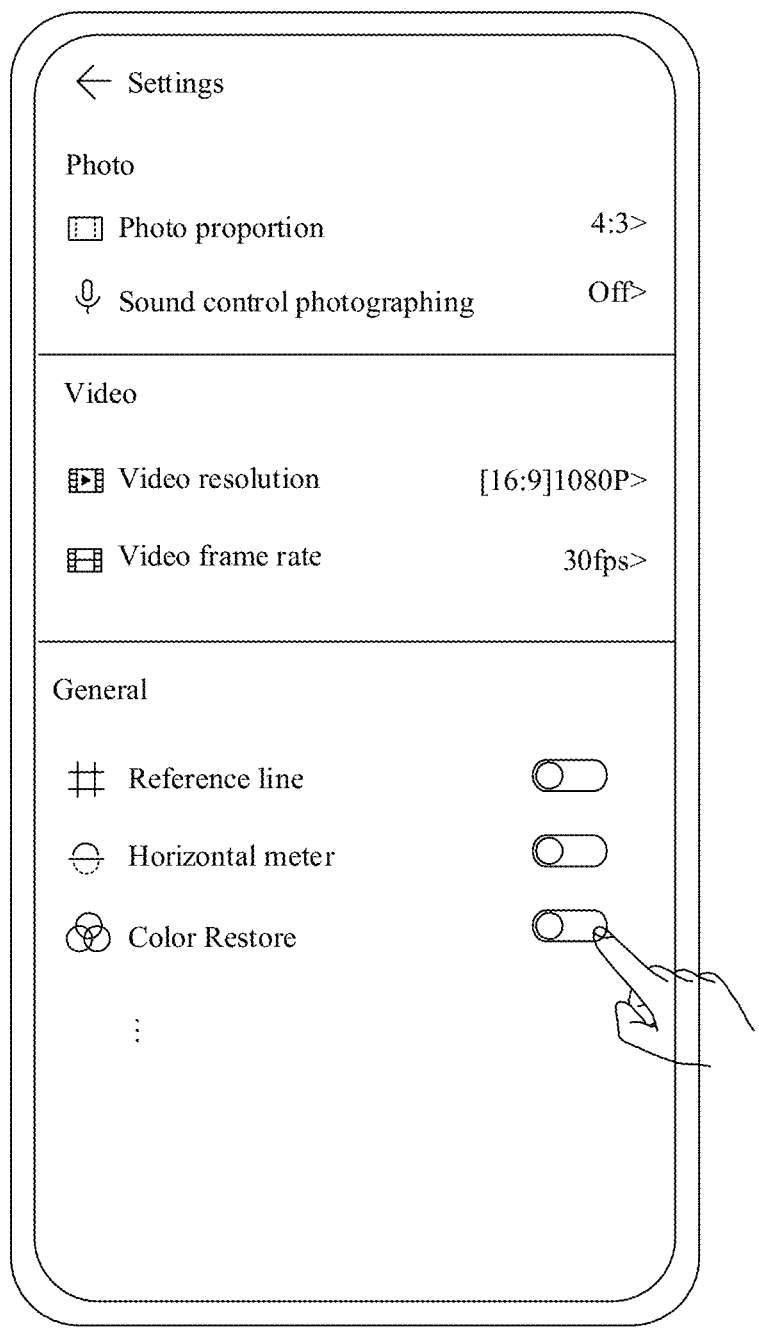

FIG. 22(a) and FIG. 22(b) are a schematic diagram of display interfaces of another electronic device according to an embodiment of this application.

For example, in response to a tap operation of the user, when the electronic device 100 runs the camera application, the electronic device 100 displays the photographing interface shown in FIG. 22(a). The upper-right corner on the photographing interface displays a "Settings" button. The user can tap the "Settings" button on the interface to enter the setting interface for setting related functions.

In response to a tap operation performed by the user on the "Settings" button, the electronic device 100 displays a setting interface shown in FIG. 22(b), and multiple functions are displayed on the interface. For example, Photo proportion is used to implement setting of a photo proportion in the photographing mode, Sound control photographing is used to implement setting of whether to trigger photographing by using a sound in the photographing mode, Video resolution is used to adjust a video resolution, Video frame rate is used to adjust a video frame rate, and in addition, there are Reference line, Horizontal meter, and Color Restore.

In response to a drag operation performed by the user on a switch button corresponding to "Color Restore", the electronic device 100 may enable, when photographing, a program related to the image processing method provided in this embodiment of this application.

It should be understood that the foregoing only two examples of the image processing method provided in the embodiments of this application are enabled for the user from a display interface of the electronic device. Certainly, the image processing method provided in the embodiments of this application may be enabled in another manner, or the image processing method provided in the embodiments of this application may be directly used in a photographing process by default. This is not limited in this embodiment of this application.

Figure 23:
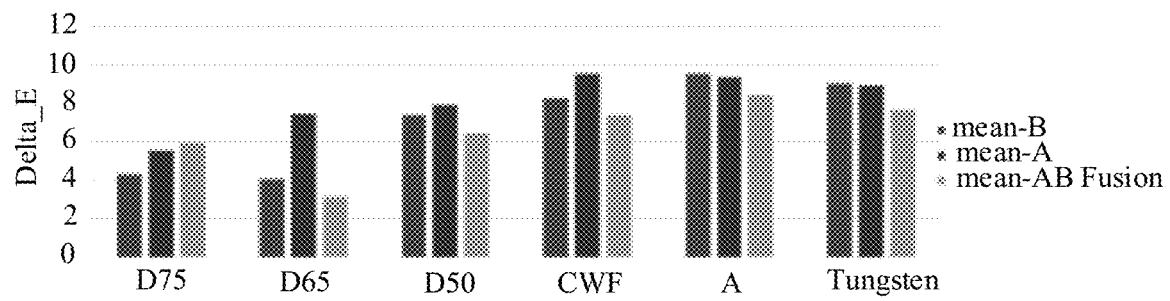
FIG. 23 is a schematic diagram of a color restoration error according to an embodiment of this application.

With reference to the foregoing embodiments, FIG. 23 is a schematic diagram of a color restoration error according to an embodiment of this application. The horizontal axis represents different color temperature sources, and the vertical axis represents a color restoration error (Delta_E).

As shown in FIG. 23, under irradiation of most color temperature light sources (for example, D65/D50/CWF/A/Tungsten), after the image processing method provided in this embodiment of this application is used to process the obtained target image, a color restoration error is less, and color restoration is more accurate.

For example, in the color temperature light source D65, a color restoration error value of an image (for example, mean-A) that is separately corresponding to the first initial image is 7.5, and a color restoration error value of an image (for example, mean-B) that is separately corresponding to the second initial image is 4. After the image processing method provided in this embodiment of this application is used, a color restoration error value of an obtained target image (for example, mean-ABfusion) is 3. Compared with the other two, the color restoration error value of the image obtained in this application is the smallest, and a color restoration effect is the best.

Figure 24:
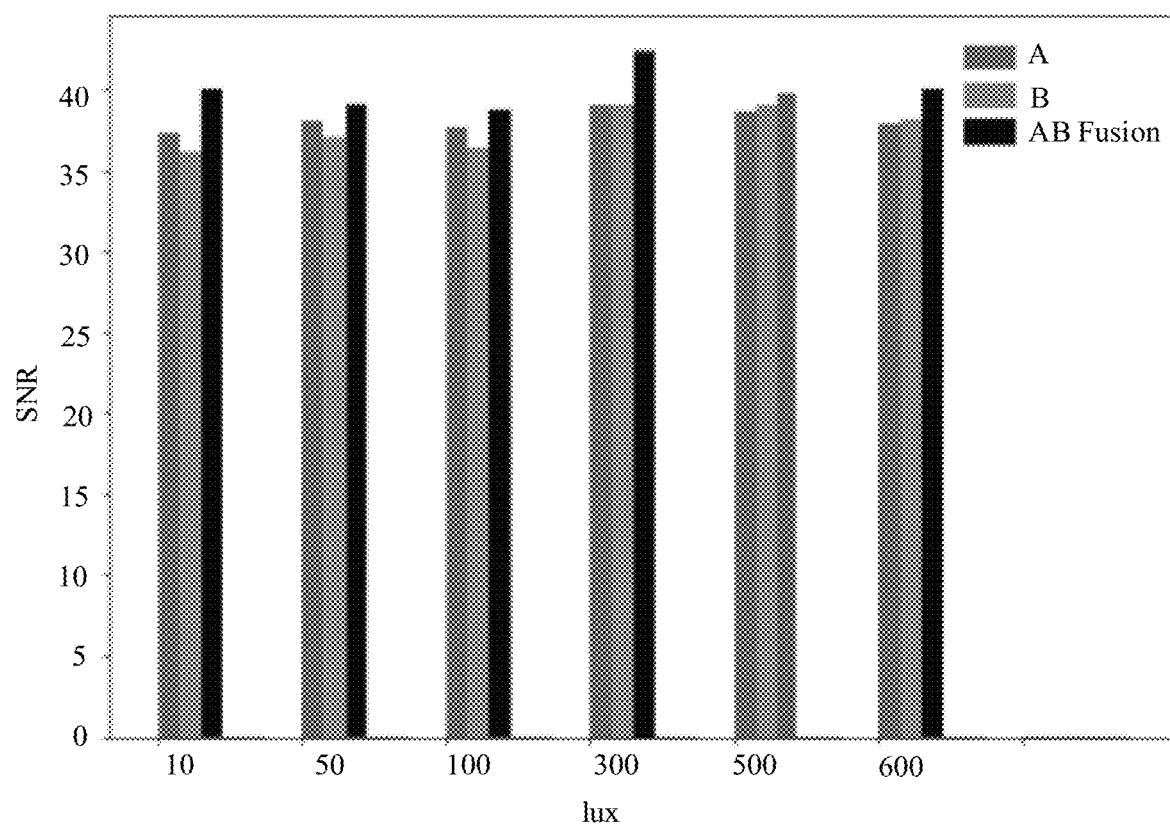
FIG. 24 is a schematic diagram of a signal-to-noise ratio in a color temperature light source D65 according to an embodiment of this application.

FIG. 24 is a schematic diagram of a signal-to-noise ratio in a color temperature light source D65 according to an embodiment of this application. The horizontal axis represents the illuminance (lux), and the vertical axis represents the signal-to-noise ratio (SNR).

As shown in FIG. 24, in the color temperature light source D65, each group of data in a histogram represents a signal-to-noise ratio corresponding to an image with different illuminance, and each group of data includes a signal-to-noise ratio corresponding to a first initial image (such as A), a signal-to-noise ratio corresponding to a second initial image (such as B), and a signal-to-noise ratio corresponding to a fused target image (such as AB Fusion). It may be learned from the figure that, compared with a separate initial image, a signal-to-noise ratio of the fused target image obtained by using the image processing method provided in this embodiment of this application is relatively higher, which indicates that signal-to-noise ratio performance of the fused target image is better.

For example, when the illuminance is 300, a signal-to-noise ratio corresponding to each of the first initial image and the second initial image is approximately 38, and a signal-to-noise ratio of the fused target image is approximately 45, and the signal-to-noise ratio is improved, which indicates that the image processing method provided in this embodiment of this application can effectively improve signal-to-noise performance of the image.

With reference to FIG. 1 to FIG. 24, the foregoing describes in detail an image processing method, a related display interface, and an effect diagram that are provided in embodiments of this application. The following describes in detail the electronic device, apparatus, and chip provided in the embodiments of this application with reference to FIG. 25 to FIG. 28. It should be understood that the electronic device, the apparatus, and the chip in the embodiments of this application may execute the foregoing various image processing methods in the embodiments of this application, that is, for a specific working process of the following products, refer to a corresponding process in the foregoing method embodiments.

Figure 25:
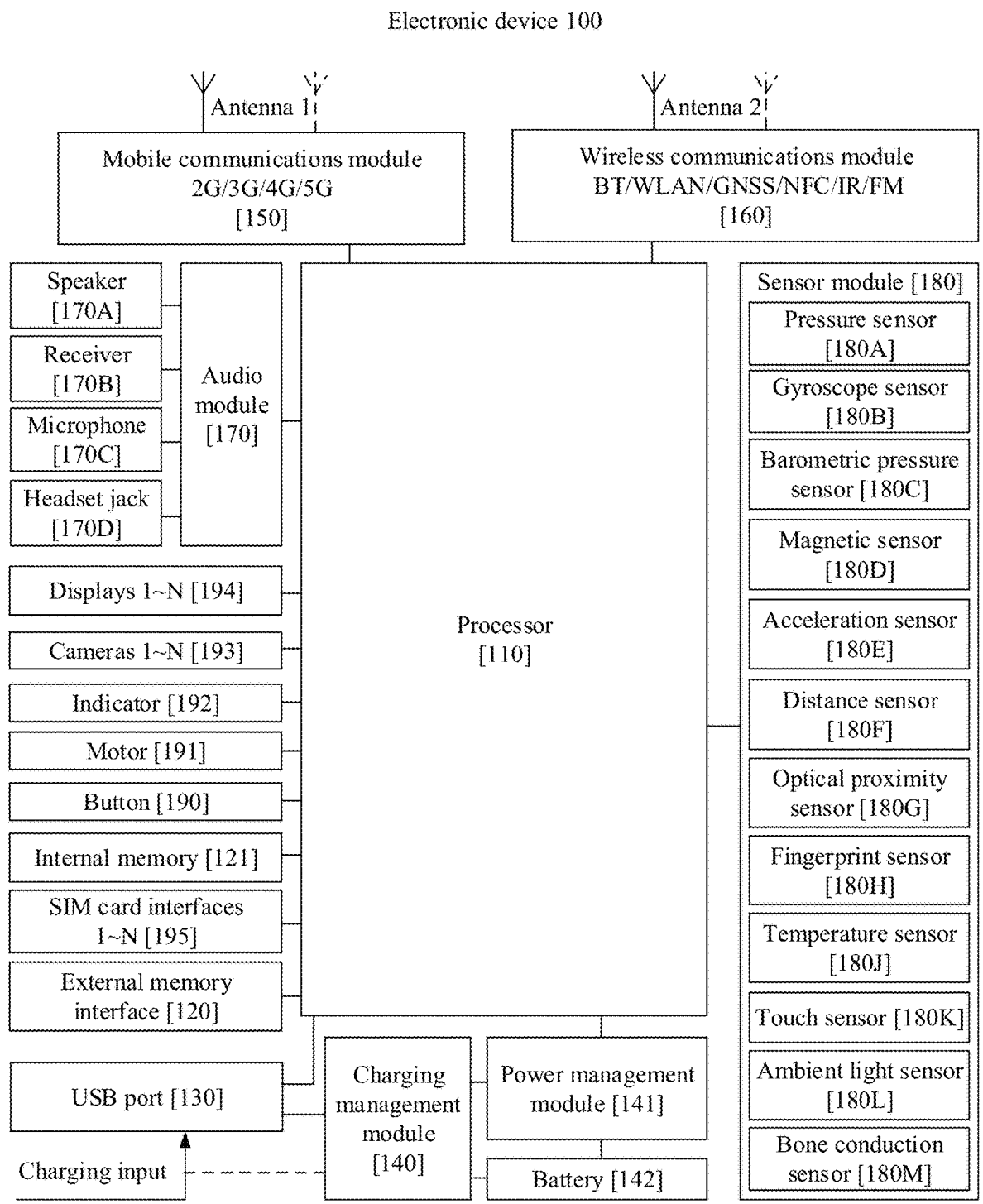
FIG. 25 is a schematic diagram of a hardware system applicable to an electronic device in this application.

FIG. 25 shows a hardware system applicable to an electronic device according to this application. The electronic device 100 may be configured to implement the image processing method described in the foregoing method embodiments.

The electronic device 100 may be a mobile phone, a smart screen, a tablet computer, a wearable electronic device, an in-vehicle electronic device, an augmented reality (augmented reality, AR) device, a virtual reality (virtual reality, VR) device, a notebook computer, an ultra-mobile personal computer (ultra-mobile personal computer, UMPC), a netbook, a personal digital assistant (personal digital assistant, PDA), a projector, or the like. A specific type of the electronic device 100 is not limited in this embodiment of this application.

The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, and a subscriber identification module (subscriber identification module, SIM) card interface 195. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, and a bone conduction sensor 180M.

It should be noted that the structure shown in FIG. 25 does not constitute a specific limitation on the electronic device 100. In other embodiments of this application, the electronic device 100 may include more or fewer components than the components shown in FIG. 25, or the electronic device 100 may include a combination of some components in the components shown in FIG. 25, or the electronic device 100 may include subcomponents of some components in the components shown in FIG. 25. The components shown in FIG. 25 may be implemented by hardware, software, or a combination of software and hardware.

The processor 110 may include one or more processing units. For example, the processor 110 may include at least one of the following processing units: an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and a neural-network processing unit (neural-network processing unit, NPU). Different processing units may be independent components, or may be integrated.

The controller may be a neural center and a command center of the electronic device 100. The controller may generate an operation control signal based on an instruction operation code and a time sequence signal, to control instruction reading and instruction execution.

A memory may be disposed in the processor 110, and is configured to store an instruction and data. In some embodiments, the memory in the processor 110 is a cache memory. The memory may store an instruction or data that has just been used or is cyclically used by the processor 110. If the processor 110 needs to use the instruction or data again, the instruction or data may be directly invoked from the memory. Therefore, repeated access is avoided, a waiting time of the processor 110 is reduced, and system efficiency is improved.

In this embodiment of this application, the processor 110 may execute a display preview interface, where the preview interface includes a first control; detect a first operation on the first control; in response to the first operation, obtain multiple frames of initial images, where the multiple frames of initial images include different channel signals; process each frame of initial image in the multiple frames of initial images to obtain a corresponding processed image; and fuse the multiple frames of processed images to obtain a target image.

The connection relationship between the modules shown in FIG. 25 is merely a schematic description, and does not constitute a limitation on the connection relationship between the modules of the electronic device 100. Optionally, modules of the electronic device 100 may also be combined in multiple connection manners in the foregoing embodiment.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover a single or a plurality of communication frequency bands. Different antennas may be multiplexed to improve antenna utilization. For example, the antenna 1 may be multiplexed into a diversity antenna of a wireless local area network. In other embodiments, the antenna may be used in combination with a tuning switch.

The electronic device 100 may implement a display function by using the GPU, the display 194, the application processor, and the like. The GPU is a microprocessor for image processing, and is connected to the display 194 and the application processor. The GPU is configured to perform mathematical and geometrical calculation, and is configured to perform graphics rendering. The processor 110 may include one or more GPUs that execute program instructions to generate or change display information.

The display 194 is configured to display an image, a video, or the like.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, a ray of light is transmitted to a light-sensitive element of the camera through a lens, an optical signal is converted into an electrical signal, and the light-sensitive element of the camera transmits the electrical signal to the ISP for processing, and converts the electrical signal into an image that can be seen. The ISP may perform algorithm optimization on a noise point, brightness, and a color of an image, and the ISP may further optimize parameters such as exposure and color temperature of a photographing scene. In some embodiments, the ISP may be disposed in the camera 193.

The camera 193 is configured to capture a still image or a video. An optical image of an object is generated through the lens, and the image is projected to the light-sensitive element. The light-sensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP, so that the ISP converts the electrical signal into a digital image signal. The ISP outputs the digital image signal to the DSP for processing. The DSP converts the digital image signal into an image signal in a standard format such as red green blue (red green blue, RGB) or YUV. In some embodiments, the electronic device 100 may include one or N cameras 193, where N is a positive integer greater than 1.

The digital signal processor is configured to process a digital signal, and in addition to a digital image signal, may further process another digital signal. For example, when the electronic device 100 performs frequency selection, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of coding formats, for example, moving picture experts group (moving picture experts group, MPEG) 1, MPEG 2, MPEG 3, and MPEG 4.

The foregoing describes in detail a hardware system of the electronic device 100. The following describes a software system of the electronic device 100.

Figure 26:
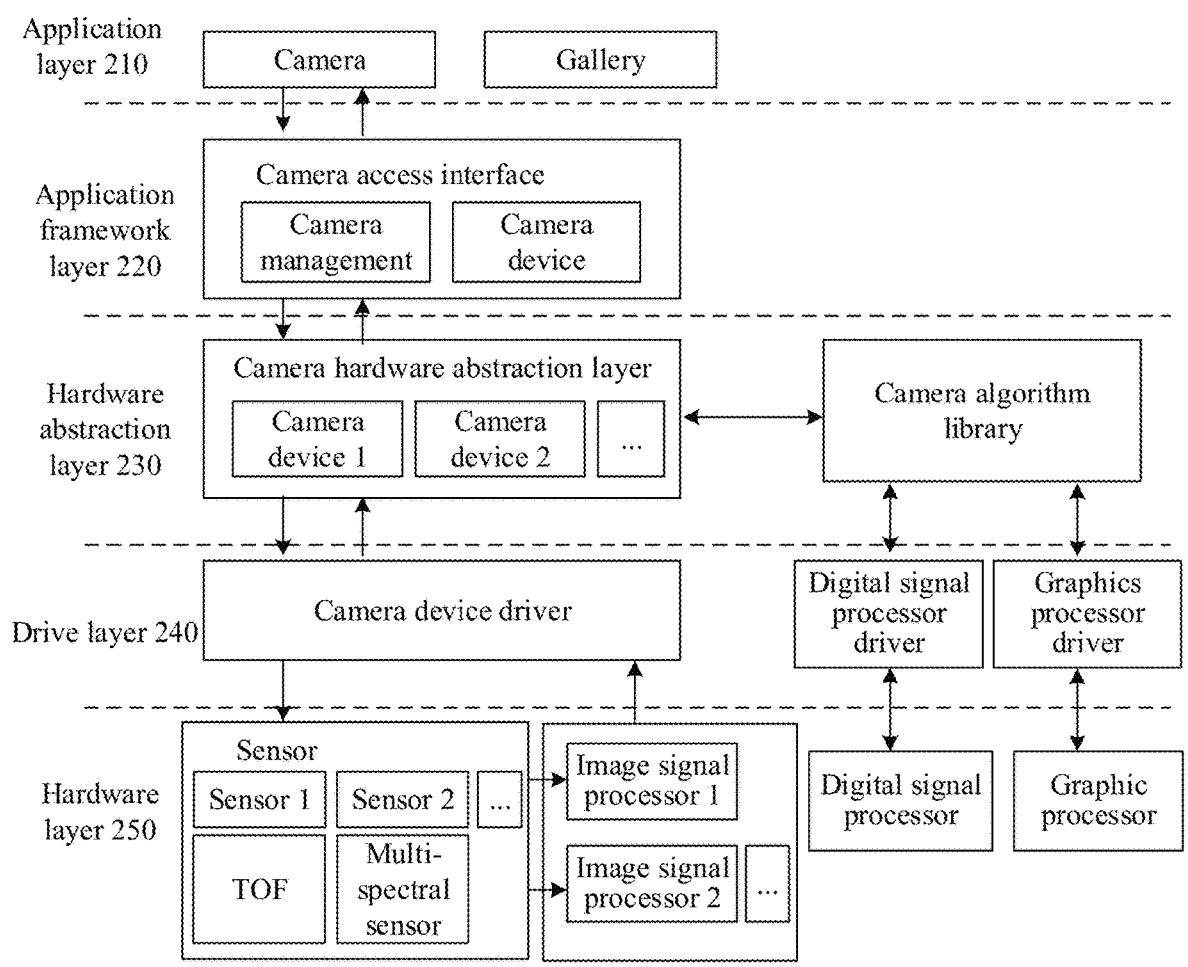
FIG. 26 is a schematic diagram of a software system applicable to an electronic device in this application.

FIG. 26 is a schematic diagram of a software system of an electronic device according to an embodiment of this application.

As shown in FIG. 26, the system architecture may include an application layer 210, an application framework layer 220, a hardware abstraction layer 230, a driver layer 240, and a hardware layer 250.

The application layer 210 may include a camera application or another application, and the another application program includes but is not limited to an application program such as a camera or a gallery.

The application framework layer 220 may provide an application programming interface (application programming interface, API) and a programming framework to an application of the application layer; The application framework layer may include some predefined functions.

For example, the application framework layer 220 may include a camera access interface. The camera access interface may include camera management and a camera device. The camera management may be configured to provide an access interface for managing a camera. The camera device may be configured to provide an interface for accessing the camera.

The hardware abstraction layer 230 is configured to abstract hardware. For example, the hardware abstraction layer may include a camera abstraction layer and another hardware device abstraction layer. The camera hardware abstraction layer may invoke the camera algorithm in the camera calculation library.

For example, the hardware abstraction layer 230 includes a camera hardware abstraction layer 2301 and a camera arithmetic library. The camera calculation library may include a software algorithm. For example, the algorithm 1 and the algorithm 2 may be software algorithms used for image processing.

The drive layer 240 is configured to provide a drive for different hardware devices. For example, the drive layer may include a camera device driver, a digital signal processor driver, and a graphics processor driver.

The hardware layer 250 may include multiple image sensors (sensor), multiple image signal processors, digital signal processors, graphics processors, and other hardware devices.

For example, the hardware layer 250 includes a sensor and an image signal processor. The sensor may include a sensor 1, a sensor 2, a time of flight (time of flight, TOF), a multi-spectral sensor, and the like. The image signal processor may include an image signal processor 1, an image signal processor 2, and the like.

In this application, by invoking a hardware abstraction layer interface in the hardware abstraction layer 230, a connection between the application program layer 210 above the hardware abstraction layer 230, the application program framework layer 220, the driver layer 240 below, and the hardware layer 250 may be implemented, so as to implement camera data transmission and function control.

In the camera hardware interface layer in the hardware abstraction layer 230, a manufacturer may customize a function herein according to a requirement. The camera hardware interface layer is more efficient, flexible, and low-latency than the hardware abstraction layer interface, and can also be more abundant to invoke the ISP and the GPU to implement image processing. An image in the input hardware abstraction layer 230 may be from an image sensor, or may be from a stored image.

The scheduling layer in the hardware abstraction layer 230 includes a generic functional interface for implementing management and control.

The camera service layer in the hardware abstraction layer 230 is configured to access the interfaces of the ISP and other hardware.

The following describes examples of working procedures of software and hardware of the electronic device 100 with reference to a photographing scenario.

The camera application in the application layer may be displayed on the screen of the electronic device 100 in an icon manner. When the icon of the camera application is tapped by the user to trigger, the electronic device 100 starts to run the camera application. When the camera application runs on the electronic device 100, the camera application invokes an interface corresponding to the camera application in the application framework layer 210. Then, the camera driver is enabled by invoking the hardware abstraction layer 230, and the camera 193 including the multi-spectral sensor on the electronic device 100 is enabled, and multiple frames of initial images of different channels are collected by using the multi-spectral sensor. In this case, the multi-spectral sensor may collect the obtained image at a specific operating frequency, process the obtained image in the multi-spectral sensor or in one or more image signal processors, and then save and/or transmit the processed target image to the display for display.

Figure 27:
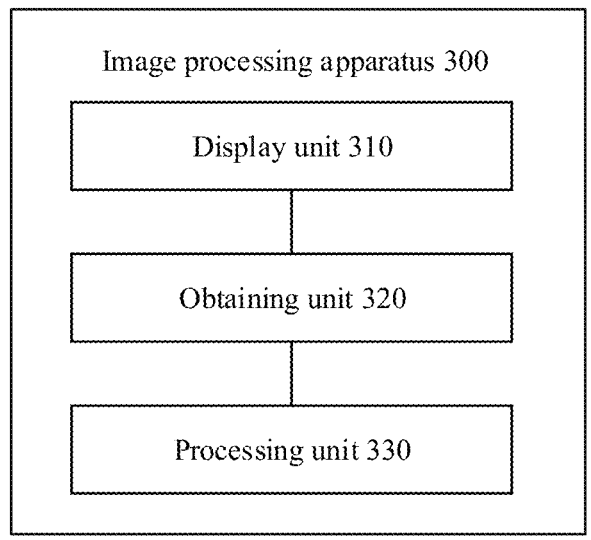
FIG. 27 is a schematic diagram of a structure of an image processing apparatus according to an embodiment of this application.

The following describes an image processing apparatus 300 configured to implement the foregoing image processing method according to an embodiment of this application. FIG. 27 is a schematic diagram of an image processing apparatus 300 according to an embodiment of this application.

As shown in FIG. 27, the image processing apparatus 300 includes a display unit 310, an obtaining unit 320, and a processing unit 330.

The display unit 310 is configured to display a preview interface, where the preview interface includes a first control.

The acquiring unit 320 is configured to detect a first operation on the first control.

The processing unit 330 is configured to obtain multiple frames of initial images in response to the first operation, where the multiple frames of initial images include different channel signals.

The processing unit 330 is further configured to process each frame of initial image in the multiple frames of initial images to obtain a corresponding processed image. The multiple frames of processed images are fused to obtain the target image.

It should be noted that the foregoing image processing apparatus 300 is embodied in a form of a functional unit. The term "unit" herein may be implemented in a form of software and/or hardware, which is not specifically limited.

For example, the "unit" may be a software program, a hardware circuit, or a combination thereof that implements the foregoing functions. The hardware circuit may include an application specific integrated circuit (application specific integrated circuit, ASIC), an electronic circuit, a processor (for example, a shared processor, a dedicated processor, or a group of processors) configured to execute one or more software or firmware programs, and a memory, a combined logic circuit, and/or other suitable components that support the described functions.

Therefore, the examples described in the embodiments of this application can be implemented by using electronic hardware or a combination of computer software and electronic hardware. Whether a function is executed in a hardware or software manner depends on a specific application and design constraint condition of a technical solution. A person skilled in the art may use different methods for each specific application to implement the described functions, but this implementation should not be considered to be beyond the scope of this application.

An embodiment of this application further provides a computer-readable storage medium, where the computer-readable storage medium stores a computer instruction. When the computer-readable storage medium runs on the image processing apparatus 300, the image processing apparatus 300 is enabled to execute the foregoing image processing method.

The computer instructions may be stored in a computer-readable storage medium or transmitted from one computer-readable storage medium to another computer-readable storage medium. For example, the computer instructions may be transmitted from one website site, computer, server or data center to another website site, computer, server or data center in a wired (for example, coaxial cable, optical fiber, digital subscriber line (digital subscriber line, DSL)) or wireless (for example, infrared, wireless, microwave) manner. The computer-readable storage medium may be any available medium accessible by a computer or include one or more data storage devices such as a server or a data center that can be integrated with the medium. The available medium may be a magnetic medium (for example, a floppy disk, a hard disk, a magnetic tape), an optical medium, or a semiconductor medium (for example, a solid state disk (solid state disk, SSD)).

An embodiment of this application further provides a computer program product that includes a computer instruction. When the computer program product runs on the image processing apparatus 300, the image processing apparatus 300 may execute the foregoing image processing method.

Figure 28:
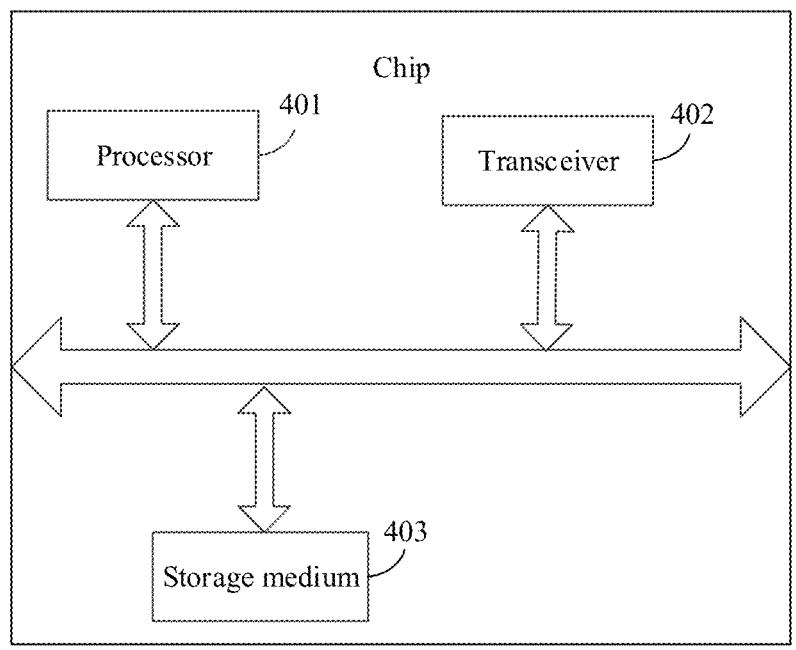
FIG. 28 is a schematic diagram of a structure of a chip according to an embodiment of this application.

FIG. 28 is a schematic diagram of a structure of a chip according to an embodiment of this application. The chip shown in FIG. 28 may be a general processor, or may be a dedicated processor. The chip includes a processor 401. The processor 401 is configured to support the image processing apparatus 300 to execute the foregoing technical solutions.

Optionally, the chip further includes a transceiver 402. The transceiver 402 is configured to receive control of the processor 401, and is configured to support the image processing apparatus 300 in executing the foregoing technical solutions.

Optionally, the chip shown in FIG. 28 may further include a storage medium 403.

It should be noted that the chip shown in FIG. 28 may be implemented by using the following circuits or devices: one or more field programmable gate arrays (field programmable gate array, FPGA), a programmable logic device (programmable logic device, PLD), a controller, a state machine, a gate logic, a discrete hardware component, any other suitable circuit, or any combination of circuits that can perform various functions described in the full text of this application.

The electronic device, the image processing apparatus 300, the computer storage medium, the computer program product, or the chip provided in the embodiments of this application are all used to execute the foregoing method provided in this specification. Therefore, for beneficial effects that can be achieved by the electronic device, the image processing apparatus 300, the computer storage medium, the computer program product, or the chip, reference may be made to beneficial effects in the foregoing corresponding methods, and details are not described herein again.

It should be understood that the foregoing is merely intended to help a person skilled in the art better understand the embodiments of this application, but not to limit the scope of the embodiments of this application. A person skilled in the art may clearly perform various equivalent modifications or changes according to the foregoing examples. For example, some steps in the foregoing detection method embodiments may be unnecessary, or some steps may be newly added. Alternatively, any two or more of the foregoing embodiments may be combined. Such modified, changed, or combined solutions also fall within the scope of the embodiments of this application.

It should be further understood that the foregoing description of the embodiments of this application focuses on highlighting differences between the embodiments. For a same or similar description that is not mentioned, reference may be made to each other. For brevity, details are not described herein again.

It should be understood that a sequence number of each step in the foregoing embodiments does not mean a sequence of execution, and should not constitute any limitation on an implementation process of the embodiments of this application. An execution sequence of each process should be determined by its function and internal logic.

It should be further understood that, in this embodiment of this application, "preset" and "predefined" may be implemented in a manner in which a corresponding code, table, or other related information is pre-stored in a device (for example, including an electronic device). A specific implementation of this application is not limited.

It should be further understood that the manners, conditions, categories, and embodiments in the embodiments of this application are merely for convenience of description, and should not constitute a special limitation. Various manners, types, circumstances, and features in the embodiments may be combined without contradiction.

It should be further understood that, in the embodiments of this application, if no special description or logic conflict exists, terms and/or descriptions of different embodiments are consistent and may be mutually referenced, and technical features of different embodiments may be combined according to an internal logical relationship of the different embodiments to form a new embodiment.

In the end, it should be noted that the foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An image processing method, applied to an electronic device comprising a multi-spectral sensor, wherein the method comprises:
   displaying a preview interface, wherein the preview interface comprises a first control;
   detecting a first operation on the first control;
   obtaining multiple frames of initial images in response to the first operation, wherein channel signals comprised in the multiple frames of initial images are different;
   processing each frame of initial image in the multiple frames of initial images, to obtain a processed image corresponding to each frame of initial image; and
   fusing the multiple frames of processed images to obtain a target image, wherein the fusing the multiple frames of the processed images comprises when the multiple frames of initial images comprise a first initial image and a second initial image with different channel signals, determining a fused image $I\_f(i, j)$ based on a processed image $I\_c(i, j)$ corresponding to the first initial image, a processed image $I\_r(i, j)$ corresponding to the second image, a weight $W\_ij$ that is allocated to the processed image $I\_c(i, j)$ corresponding to the first image, and a weight $(1-W\_ij)$ that is allocated to the processed image $I\_r(i, j)$ corresponding to the second image, wherein $(i, j)$ is associated with pixel coordinates, and
   wherein the weight $W\_ij$ is determined based at least on a scenario type weight $Wc\_ij$ and a light intensity weight $Wa\_ij$, wherein $Wa\_ij$ is determined at least based on an illuminance in a photographing environment E and a preset standard illuminance E_standard.

2. The image processing method according to claim 1, wherein
   the processing each frame of initial image in the multiple frames of initial images comprises:
   performing front-end processing on each frame of initial image in the multiple frames of initial images to obtain a front-end processed image located in a RAW domain; and
   the fusing the multiple frames of processed images to obtain a target image comprises:
   performing RAW domain fusion processing on the front-end processed images to obtain a fused image located in the RAW domain; and
   performing first back-end processing on the fused image located in the RAW domain to obtain the target image located in a YUV domain.

3. The image processing method according to claim 2, wherein the method further comprises:
   obtaining multiple image signals by using a multi-spectral sensor;
   determining the multiple frames of initial images in the multi-spectral sensor based on the multiple image signals, and performing front-end processing on each frame of initial image in the multiple frames of initial images to obtain the front-end processed image located in the RAW domain; and performing RAW domain fusion processing on the front-end processed image in the multi-spectral sensor to obtain the fused image located in the RAW domain.

4. The image processing method according to claim 2, wherein the front-end processing comprises at least one of defect pixel correction, noise reduction, lens shading correction, and wide range compression.

5. The image processing method according to claim 2, wherein the first back-end processing comprises color correction and conversion from the RGB domain into the YUV domain.

6. The image processing method according to claim 5, wherein both the first back-end processing and the second back-end processing further comprise at least one of Gamma correction or style change.

7. The image processing method according to claim 2, wherein the method further comprises:
processing different initial images in the multiple frames of initial images in different image signal processors respectively, to obtain respective corresponding processed images.

8. The image processing method according to claim 7, wherein the method further comprises:
obtaining a to-be-preprocessed image by using the multi-spectral sensor; and
preprocessing the to-be-preprocessed image to obtain the multiple frames of initial images, wherein the preprocessing is used for converting a channel signal comprised in the to-be-preprocessed image.

9. The image processing method according to claim 1, wherein
the processing each frame of initial image in the multiple frames of initial images comprises:
performing front-end processing and color correction on each frame of initial image in the multiple frames of initial images to obtain a corrected image located in an RGB domain, wherein the color correction is used for converting an image from an RAW domain into the RGB domain; and
the fusing the multiple frames of processed images to obtain a target image comprises:
performing RGB domain fusion processing on the corrected images to obtain a fused image located in the RGB domain; and
performing second back-end processing on the fused image located in the RGB domain to obtain the target image located in a YUV domain.

10. The image processing method according to claim 9, wherein the second back-end processing comprises conversion from the RGB domain into the YUV domain.

11. The image processing method according to claim 1, wherein
the processing each frame of initial image in the multiple frames of initial images comprises:
performing front-end processing and first back-end processing on each frame of initial image in the multiple frames of initial images to obtain an intermediate processed image located in a YUV domain, wherein the intermediate processing is used for converting an image from an RGB domain into the YUV domain; and
the fusing the multiple frames of processed images to obtain a target image comprises:
performing YUV domain fusion processing on the intermediate processed images to obtain a fusion image located in the YUV domain, wherein the fusion image is the target image.

12. The image processing method according to claim 1, wherein the method further comprises:
in a same image signal processor, processing each frame of initial image in the multiple frames of initial images to obtain a processed image corresponding to each frame of initial image, and fusing the multiple frames of processed images to obtain the target image.

13. The image processing method according to claim 1, wherein the method further comprises:
processing different initial images in the multiple frames of initial images in different image signal processors respectively, to obtain respective corresponding processed images.

14. The image processing method according to claim 13, wherein the method further comprises:
obtaining a to-be-preprocessed image by using a multi-spectral sensor; and
preprocessing the to-be-preprocessed image to obtain the multiple frames of initial images, wherein the preprocessing is used for converting a channel signal comprised in the to-be-preprocessed image.

15. The image processing method according to claim 1, wherein
determining the fused image $I\_f(i, j)$ is based on:
$$I\_f(i,j)=W\_ij \times I\_c(i,j)+(1-W\_ij) \times I\_r(i,j).$$

16. The image processing method according to claim 15, wherein
$W\_ij$ is determined based on:
$$W\_ij=Wa\_ij \times para1+Wb\_ij \times para2+Wc\_ij \times para3;$$
wherein
the $Wa\_ij=E/E\_standard$, $Wb\_ij$ is a color temperature weight, $Wb\_ij=T/T\_standard$, wherein $T$ is a color temperature in a photographing environment, and $T\_standard$ is a preset standard color temperature; and wherein the $Wc\_ij$ corresponds to different scenario types comprising at least one of Portrait or Landscape; and where para1, para2, and para3 are preset parameters.

17. The image processing method according to claim 16, wherein the method further comprises:
when the scenario type is HDR, $Wc\_ij=(GA\_standard-GA\_ij)/GA\_standard$; wherein
$GA\_ij$ is a grayscale value corresponding to a pixel whose pixel coordinates are $(i, j)$, and $GA\_standard$ is a preset standard grayscale value.

18. The image processing method according to claim 1, wherein
the multi-spectral sensor is configured to obtain the multiple frames of initial images.

19. A chip, comprising a processor, configured to invoke and run a computer program from a memory, so that the electronic device in which the chip is installed executes the image processing method according to claim 1.

20. An electronic device, coupled to memory storing instructions that, when executed by the processing device, causes the processing device to perform operations comprising:
displaying a preview interface, wherein the preview interface comprises a first control;
detecting a first operation on the first control;
obtaining multiple frames of initial images in response to the first operation, wherein channel signals comprised in the multiple frames of initial images are different;
processing each frame of initial image in the multiple frames of initial images, to obtain a processed image corresponding to each frame of initial image; and fusing the multiple frames of processed images to obtain a target image, wherein the fusing the multiple frames of the processed images comprises when the multiple frames of initial images comprise a first initial image and a second initial image with different channel signals, determining a fused image $I\_f(i, j)$ based on a processed image $I\_c(i, j)$ corresponding to the first initial image, a processed image $I\_r(i, j)$ corresponding to the second image, a weight $W\_ij$ that is allocated to the processed image $I\_c(i, j)$ corresponding to the first image, and a weight $(1-W\_ij)$ that is allocated to the processed image $I\_r(i, j)$ corresponding to the second image, wherein $(i, j)$ is associated with pixel coordinates, and wherein the weight $W\_ij$ is determined based at least on a scenario type weight $Wc\_ij$ and a light intensity weight $Wa\_ij$, wherein $Wa\_ij$ is determined at least based on an illuminance in a photographing environment $E$ and a preset standard illuminance $E\_standard$.

* * * * *